(12) United States Patent
Li et al.

(10) Patent No.: US 11,807,728 B2
(45) Date of Patent: Nov. 7, 2023

(54) FLUORINE-CONTAINING POLYCAPROLACTONE FILM AND PREPARATION METHOD THEREFOR

(71) Applicant: SOOCHOW UNIVERSITY, Suzhou (CN)

(72) Inventors: Zhanxiong Li, Suzhou (CN); Haipeng Wang, Suzhou (CN); Wulong Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 601 days.

(21) Appl. No.: 17/106,144

(22) Filed: Nov. 29, 2020

(65) Prior Publication Data

US 2021/0079184 A1 Mar. 18, 2021

Related U.S. Application Data

(63) Continuation of application No. PCT/CN2018/088911, filed on May 29, 2018.

(51) Int. Cl.
*C08G 81/02* (2006.01)
*C08J 5/18* (2006.01)
(Continued)

(52) U.S. Cl.
CPC ............. *C08J 5/18* (2013.01); *B29D 99/005* (2013.01); *C08G 63/91* (2013.01); *C08G 81/02* (2013.01);
(Continued)

(58) Field of Classification Search
CPC .... C08G 81/027; C08F 120/22; C08F 120/24; C08J 2367/04
See application file for complete search history.

(56) References Cited

U.S. PATENT DOCUMENTS

| | | | |
|---|---|---|---|
| 5,750,218 A * | 5/1998 | Nishida | C08J 5/18 528/417 |
| 7,981,964 B2 * | 7/2011 | Konishi | C09D 175/16 560/189 |

(Continued)

FOREIGN PATENT DOCUMENTS

| | | |
|---|---|---|
| CN | 103059314 A | 4/2013 |
| CN | 105754107 A | 7/2016 |

(Continued)

*Primary Examiner* — Michael M Dollinger
(74) *Attorney, Agent, or Firm* — SZDC LAW P.C.

(57) ABSTRACT

A method of preparing a fluorinated polycaprolactone membrane includes the following steps: (1) reacting a polycaprolactone with an aminoalcohol compound to prepare a hydroxyl-terminated polycaprolactone; (2) reacting the hydroxyl-terminated polycaprolactone with an anhydride to prepare a carboxyl-terminated polycaprolactone; (3) reacting an ethylene glycol bromoisobutyrate with a fluorinated acrylate to prepare a hydroxyl-terminated fluoro-acrylate polymer; (4) reacting the carboxyl-terminated polycaprolactone with the hydroxyl-terminated fluoro-acrylate polymer to prepare a fluorinated polycaprolactone; (5) at room temperature, dissolving the fluorinated polycaprolactone in an organic solvent to prepare a solution; then naturally drying the solution at room temperature to prepare the fluorinated polycaprolactone membrane.

10 Claims, 8 Drawing Sheets

(51) Int. Cl.
  *B29D 99/00* (2010.01)
  *C08G 63/91* (2006.01)
  *B29K 67/00* (2006.01)
(52) U.S. Cl.
  CPC .... *B29K 2067/00* (2013.01); *B29K 2995/006* (2013.01); *C08J 2367/04* (2013.01)

(56) References Cited

U.S. PATENT DOCUMENTS

2012/0129797 A1      5/2012  Simeon et al.
2018/0009955 A1 *    1/2018  Kajihara ............. C09D 125/14

FOREIGN PATENT DOCUMENTS

| CN | 105754122 A |   | 7/2016  |                |
|----|-------------|---|---------|----------------|
| CN | 108159477 A | * | 6/2018  | ............. A61L 15/26 |
| CN | 108409993 A |   | 8/2018  |                |
| CN | 108611861 A | * | 10/2018 | ........... C08G 81/027 |
| JP | 2013501560 A |  | 1/2013  |                |

* cited by examiner (a)

(b)

(c)

(a)

(b)

FLUORINE-CONTAINING POLYCAPROLACTONE FILM AND PREPARATION METHOD THEREFOR

This application is a Continuation Application of PCT/CN2018/088911, filed on May 29, 2018, which is incorporated by reference for all purposes as if fully set forth herein.

TECHNICAL FIELD

The invention relates to a polymer modification technology, in particular to a fluorinated polycaprolactone membrane and its preparation method.

BACKGROUND TECHNIQUE

Polycaprolactone (poly-caprolactone, PCL) is a class of linear aliphatic polyesters obtained by ring-opening polymerization of ω-caprolactone monomers under the catalysis of metal organic compounds (such as tetraphenyltin). Degradability, good biocompatibility, drug permeability and mechanical properties, has obtained the US FDA certification, has been extensively researched and applied in the field of film applications. Polycaprolactone (PCL) has a melting point of 59 to 64° C. and a glass transition temperature at −60° C. Its structural repeating unit has 5 non-polar methylene —$CH_2$— and one polar ester group —COO—, namely —($COOCHCH_2CH_2CH_2CH_2CH_2$—)Pn. This structure makes PCL have good flexibility and processability. At the same time, this material has good biocompatibility.

At present, the research on the application of polycaprolactone as a biomaterial is the most extensive, especially the research and application reports on the biomedical fields such as the biomaterial scaffold for human tissue repair and the sustained release of drugs. In these fields of application, when polycaprolactone is used as a tissue scaffold in contact with human body fluids, such as artificial nerves and artificial blood vessels, the inner wall of the tube may adsorb active components in the body fluid when it contacts the body fluid, which may cause deposits to adhere to the wall Sometimes it even causes the wall of the pipe to be blocked. Therefore, hydrophobic modification of polycaprolactone has been proposed.

However, polycaprolactone lacks a reactive pendant functional group on the macromolecular chain, and it is difficult to provide a hydrophobic material through modification such as chemical grafting of the side chain. Therefore, the active end group of polycaprolactone is converted into a carbon bromide bond (C—Br), and then an atom transfer radical polymerization (ATRP) method is used to obtain a block copolymer by radical polymerization of unsaturated monomers such as acrylate. It is expected to realize the chemical modification of polycaprolactone. This method has the following defects in the polymerization process: (1) Affected by the macromolecular chain, the carbon-bromo bond (C—Br) at the end of the polycaprolactone chain has poor activity, and it is difficult to effectively initiate the polymerization of unsaturated monomers to achieve changes. (2) Because the fluorine-containing monomer block-modified polycaprolactone is hydrophobic and has a low polarity, it is difficult to dissolve in conventional organic solvents, and it may precipitate from the conventional organic solvent system at the initial stage of the block polymerization reaction. As a result, the fluoropolymer blocks inserted during chemical modification are short, the modification effect is not ideal, and the controllability is poor. It is difficult to use a solvent that can dissolve the block-modified polycaprolactone (such as an organic fluorine solvent). Dissolved atom transfers radical polymerization (ATRP) initiator.

In addition, compared with PCL, fluoropolymer materials are less difficult to degrade. For example, the fluoroalkyl chain has a carbon-fluorine bond (CF) with a bond energy of 460 kJ/mol, which is about 4 times the carbon-carbon bond (CC) bond energy. Therefore, the carbon-fluorine bond is very stable and difficult to crack. Fluorine compounds are difficult to decompose, and have cumulative and biological toxicity. This chemical structural feature makes it difficult for the fluorine-containing polymer to degrade the polymer in the form of side group removal. In addition, fluorine-containing materials can give polymers excellent liquid repellency, low surface energy, and low polarity, so they are not conducive to biosorption and degradation. It is precisely because of these essential properties of fluorine-containing polymer materials that it is very necessary to develop a class of fluorine-containing polymer materials with degradation ability.

Technical Problem

The purpose of the invention is to provide a block modified polycaprolactone membrane, which is a fluorine-containing alkyl polyacrylate block-modified polycaprolactone membrane.

Technical Solutions

In order to achieve the object of the invention above, the technical solution adopted by the present invention was:

A method of preparing fluorinated polycaprolactone membrane, it includes the following steps:

(1) reacting a polycaprolactone with an aminoalcohol compound to prepare a hydroxyl-terminated polycaprolactone;

(2) reacting the hydroxyl-terminated polycaprolactone with an anhydride to prepare a carboxyl-terminated polycaprolactone;

(3) reacting an ethylene glycol bromoisobutyrate with a fluorinated acrylate to prepare a hydroxyl-terminated fluoroacrylate polymer;

(4) reacting the carboxyl-terminated polycaprolactone with the hydroxyl-terminated fluoro-acrylate polymer to prepare a fluorinated polycaprolactone;

(5) at room temperature, dissolving the fluorinated polycaprolactone in an organic solvent to prepare a solution; then naturally drying the solution at room temperature to prepare the fluorinated polycaprolactone membrane.

The chemical structural formula of the fluorinated polycaprolactone of this invention is as follow,

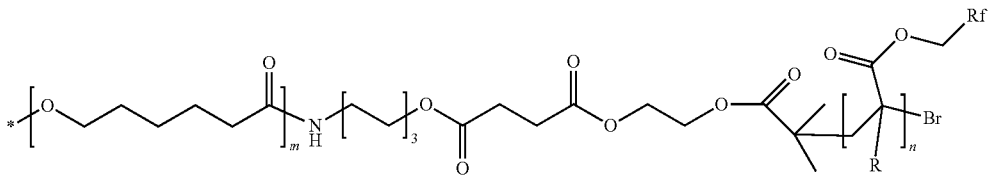

Wherein, Rf is fluorinated alkyl; R is hydrogen or methyl; m is 35 to 1300; n is 5 to 100; and the asterisk represents from polycaprolactone.

Preferably, wherein the fluorinated alkyl is nonafluoropentyl, tridecafluorooctyl, hexafluorobutyl, dodecafluoroheptyl, or octafluoropentyl, ($—CH_2(CF_2)_3CF_3$, $—CH_2(CF_2)_5\ CF_3$, $—CH_2(CF_2)_7CF_3$, $—CF_2CFHCF_3$, $—CH_2(CF_2)_4H$, $—(CF_2)_6H$); wherein the alkyl is methyl.

In the invention, a molecular weight of the polycaprolactone is 45600 to 148200; the aminoalcohol compound is 6-Amino-1-hexanol; the anhydride is succinic anhydride; the fluorinated acrylate is fluoropentyl acrylate, trifluorooctyl acrylate, heptadecafluorodecyl acrylate, hexafluorobutyl acrylate, dodecylfluoroheptyl acrylate, or octafluoropentyl acrylate.

In the invention, the organic solvent is dichloromethane, tetrahydrofuran, fluorosolvent, or a combination thereof; the concentration of the solution is 1 to 10 wt %; the fluorinated polycaprolactone of the invention has good solubility, and it is dissolved in non-fluorine conventional solvents, thus providing a basis for the preparation of thin films.

In the present invention, a mass ratio of the polycaprolactone and aminoalcohol compounds is 1:0.2 to 2; a mass ratio of the hydroxyl-terminated polycaprolactone and anhydrides is (1 to 200):(0.5 to 2); a mass ratio of the ethylene glycol bromoisobutyrate and fluorinated acrylate is ($1\times10^{-6}$ to $5\times10^{-5}$):(0.5 to 5); a mass ratio of the carboxyl-terminated polycaprolactone and hydroxyl-terminated fluoro-acrylate polymer is (1 to 4):(0.05 to 10).

In the present invention, the step (1) is conducted at room temperature under nitrogen protection for 1 to 24 hours; the step (2) is conducted at room temperature under nitrogen protection for 1 to 6 hours; the step (3) is conducted at 50 to 90° C. under nitrogen protection for 1 to 24 hours; and the step (4) is conducted at 30 to 65° C. under nitrogen protection for 1 to 8 hours.

The step (1) is conducted in the organic solvent; the step (2) is conducted in the organic solvent in the presence of anhydrous potassium carbonate and 4-dimethylaminopyridine; the step (3) is conducted in the organic solvent in the presence of pentamethyldiethylenetriamine and cuprous bromide; and the step (4) is conducted in the organic solvent in the presence of N,N'-carbonyldiimidazole.

In the step (4), the carboxyl-terminated polycaprolactone is reacted with N,N'-carbonyldiimidazole under nitrogen for 1 to 24 hours at room temperature; then hydroxyl-terminated fluoro-acrylate polymer solution is added and reacted at 30 to 65° C. for 1 to 8 hours to prepare the fluorinated polycaprolactone.

This invention also disclosed the fluorinated polycaprolactone membrane that is prepared by the preparation method above.

In the present invention, to purify after the reaction was completed above, it could be performed as follows:

Step (1): after the reaction was completed, the reaction solution was added anhydrous ethanol of 10 to 300 parts. After filtration, the filter cake was washed with 1 to 2 parts of anhydrous ethanol for 3 times, and dried under vacuum at 30 to 50° C. for 1 to 24 hours, to obtain hydroxyl-terminated polycaprolactone PCL-OH.

After the step (2), the reaction was filtered, and the filtrate was added 0.3 to 1.0 parts of acetic acid, and the solution is added to 20 to 500 parts of deionized water to precipitate a solid. After filtration, the filter cake was washed with 2 to 10 parts of anhydrous ethanol 3 times, and dried under vacuum at 30 to 50° C. for 1 to 24 hours to obtain carboxyl-terminated polycaprolactone PCL-COOH.

Step (3) After the reaction was completed, added 1 to 20 parts of THF and 1 to 20 parts of fluorine-containing organic solvent and pass through the neutral alumina column (200 to 300 mesh) to obtain the light yellow clear solution. The solution was evaporated under reduced pressure at 30 to 70° C., and the solvent was removed under reduced pressure. The crude product was added to 5 to 30 parts of anhydrous methanol to precipitate a solid, filtered, and washed with 1 to 3 parts of n-hexane for 3 times at 30 to 100° C. It was vacuum-dried at 1° C. for 1 to 24 hours to obtain a hydroxyl-terminated fluoro-acrylate polymer.

Step (4) After the reaction was completed, putted the reaction solution into 5 to 200 parts of n-hexane, precipitated the crude production, filtered, washed with 2 to 10 parts of absolute ethanol for 3 times, and dried under vacuum at 30 to 50° C. for 1~24 h, the block modified polycaprolactone with fluorinated alkyl polymer was obtained, which was a fluorinated polycaprolactone membrane.

The fluorine-containing organic solvent was trifluoromethyl benzene, 1,3-bis(trifluoromethyl) benzene, or a combination thereof.

The invention hydroxylated and carboxylated the high-molecular-weight polycaprolactone at the first; then synthesized the hydroxyl-terminated fluoro-acrylate polymer with a controllable polymerization degree by the ATRP method; at the last under the activation of N,N'-carbonyldiimidazole (CDI), the esterification reaction of carboxyl-terminated polycaprolactone and the hydroxyl-terminated fluoro-acrylate polymer was carried out in the mild condition, to obtain fluoroalkyl polyacrylate block-modified polycaprolactone. The reaction structure was shown in the attached FIG. 1.

Beneficial Effect

Compared with the prior arts, the technical solution provided by the present invention had the following beneficial effects:

(1) After the high molecular weight PCL is activated with a carboxyl terminal and N,N'-carbonyldiimidazole (CDI) is activated, it can be directly condensed with an organic fluoropolymer containing a reactive hydroxyl group, with a high degree of reaction and mild reaction conditions.

(2) The end group activated fluoropolymer is prepared in advance from ATRP and then inserted into the PCL molecular chain. Since the fluoropolymer is obtained in a homogeneous system, it is easy to control the degree of polymerization of the fluoropolymer and the modified PCL. The product has a narrow molecular weight distribution. At the same time, it also solves the problem that due to the change in solubility, it is difficult to directly generate the fluoropolymer chain in situ at the end of the PCL chain.

(3) By introducing degradable segment polycaprolactone (PCL) into the molecular structure of the fluoropolymer, a degradable fluoropolymer material was obtained; the molecular weight of the PCL was controlled to obtain a block polymer, and degradation performance was obtained. Different fluorinated polymer materials; PCL block-modified fluoropolymers can be directly condensed by carboxyl-terminated PCL under the action of an activator and an active hydroxyl-containing organic fluoropolymer under mild reaction conditions, which can avoid PCL in the entire preparation Thermal degradation occurred during the reaction.

(4) The preparation of block-modified PCL according to the present invention can avoid PCL degradation, so the obtained fluorinated polycaprolactone (PCL) film product has a high molecular weight, a simple preparation process, readily available raw materials, and easy industrial production and promotion and application.

EMBODIMENTS OF THE INVENTION

Figure 1:
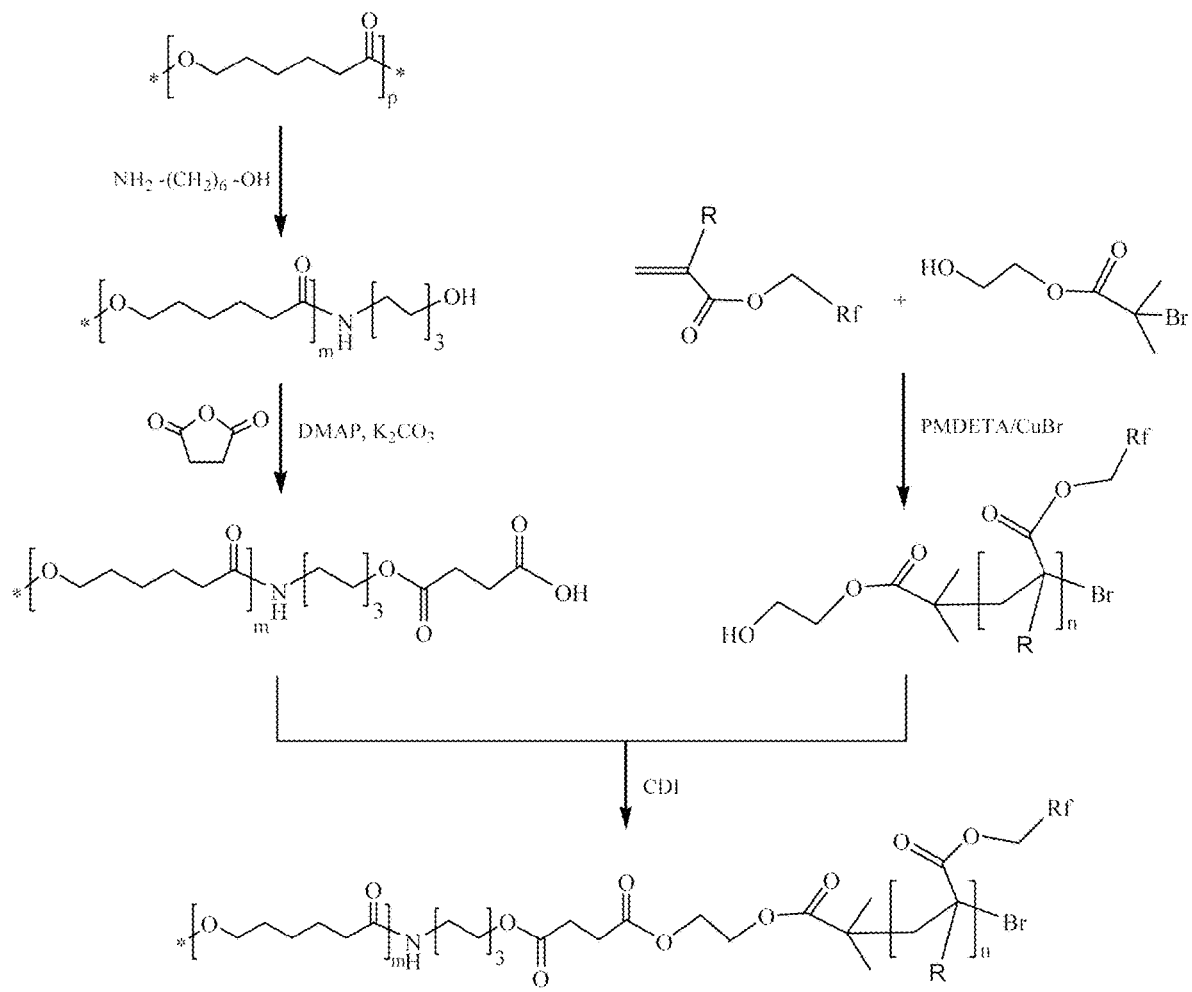
FIG. 1 shows the schematic diagram of the reaction for preparing the fluorinated polycaprolactone.

The invention was further described below with reference to the drawings and embodiments.

Example 1

(1) Hydroxylation of Polycaprolactone Terminal

Dissolved the 50.0 g of PCL with the molecular weight of 80,000 into the 500 g of 1,4-dioxane at 37° C., added 51 g of 6-amino-1-hexanol under nitrogen protection, and the reaction was performed for 8 hours. After the reaction was completed, the reaction solution was slowly added to 1000 g of anhydrous ethanol under constant stirring to precipitate a solid. After filtration, the filter cake was washed for 3 times with 100 g of the absolute ethanol and dried under vacuum at 37° C. for 24 h to obtain 39.6 g of the product with the 79.2% of yield. The molecular weight of the product was measured to be 69,800.

(2) Carboxylation of Polycaprolactone Terminal

After stirred and dissolved 25.0 g of the hydroxyl-terminated polycaprolactone (PCL-OH) prepared above and 28.5 g of succinic anhydride, and 500 g of 1,4-dioxane. Added 9.85 g of anhydrous potassium carbonate ($K_2CO_3$) and 8.70 g of 4-dimethylaminopyridine (DMAP), and the reaction was carried out at room temperature under nitrogen for 2 h. After the reaction was completed, filtration was performed, and 15 g of acetic acid was added to the filtrate. The solution was added to 1000 g of deionized water to precipitate a solid. After filtration, the filter cake was washed with 120 g of anhydrous ethanol for 3 times, and dried under vacuum at 37° C. for 24 h to obtain 21.5 g of the product with the 86.0% of yield. The molecular weight of the product was measured to be 68,500.

(3) Preparation of Hydroxyl-Terminated Poly (1H, 1H, 2H, 2H-Tridecylfluorooctyl Acrylate) by ATRP Method The 420 μg of ethylene glycol bromoisobutyrate and the 642 μg of pentamethyldiethylenetriamine (PMDETA) were dissolved in 60 g of 2-butanone. After dissolving, 0.4 g of cuprous bromide is added, and under nitrogen protection at 40° C. The reaction was stirred for 15 min to obtain a catalyst. Added 63.0 g of 1H, 1H, 2H, 2H-tridecylfluorooctyl acrylate (TFOA), heated to 80° C., and reacted for 2 hours. After the reaction was completed, 300 g of THF and 100 g of trifluorotoluene were added and passed through the neutral alumina column (200 to 300 mesh) to obtain the pale yellow clear solution. The solvent was removed by rotary distillation under reduced pressure at 65° C., and then the crude product was added to 950 g of anhydrous methanol to precipitate the solid, which was filtered, washed with 150 g of n-hexane for 3 times, and dried under vacuum at 55° C. for 24 hours to obtain 57.1 g of the hydroxyl-terminated fluoro-acrylate polymer, and the 90.6% of yield.

(4) Esterification to Prepare Block Polymers

Figure 2:
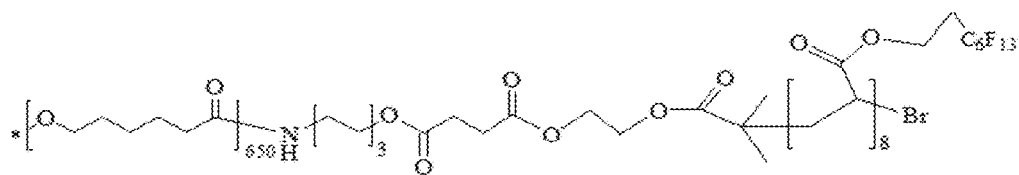
FIG. 2 shown the schematic structural diagram of the fluorinated polycaprolactone of Example 1.

Dissolve 7.0 g of carboxyl-terminated polycaprolactone (PCL-COOH) in 80 g of anhydrous THF in a three-necked flask at room temperature, added 4.7 g of N,N'-carbonyldiimidazole (CDI), and protected it at 30° C. under nitrogen reacted for 2 h. The 0.5 g of hydroxyl-terminated poly (1H, 1H, 2H, 2H-tridecylfluorooctyl acrylate) was dissolved in 30 g of trifluorotoluene to prepare the solution, and the solution was added to a three-necked flask. The reaction mixture was reacted at 53 to 55° C. for 3 h. After the reaction, the reaction solution was poured into 280 g of n-hexane to precipitate a crude product, which was filtered, washed with 45 g of anhydrous ethanol for 3 times, and then dried under vacuum at 37° C. for 3 h to obtain the 6.5 g of fluorinated polycaprolactone, which was the fluorine-containing alkyl polyacrylate block-modified polycaprolactone, 86.7% of the yield. The molecular weight of the product was measured to be 72,800. The structural formula of the product was shown in FIG. 2.

(5) Hydrophobicity Test

Figure 13:
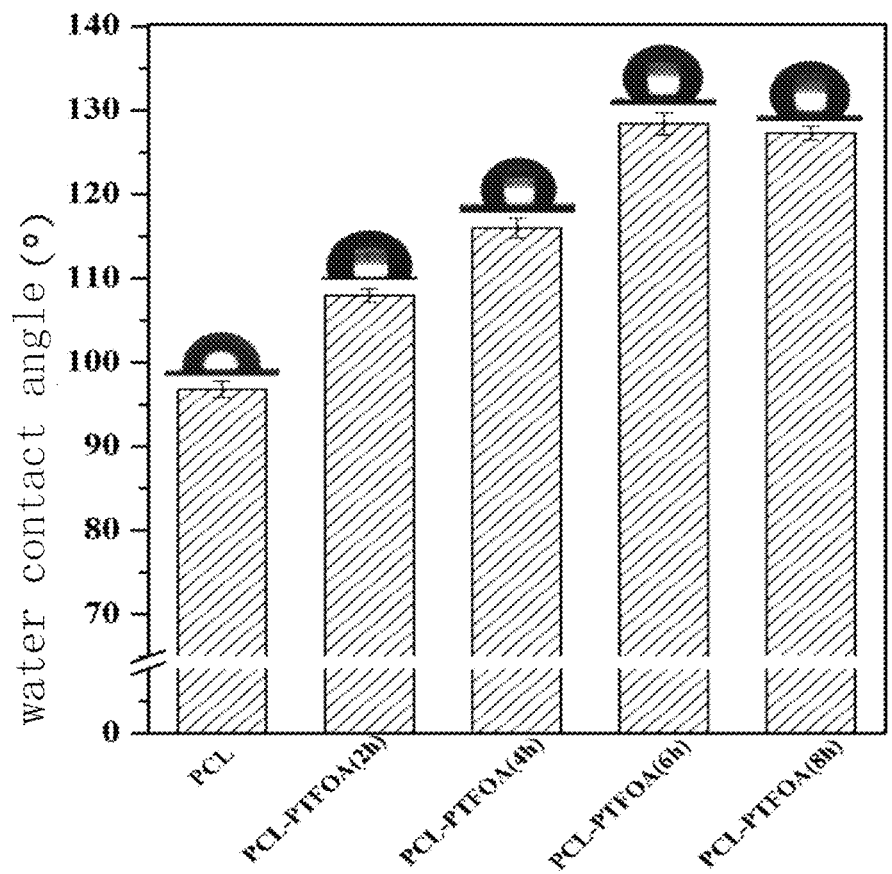
FIG. 13 shows the test chart of water contact angle of unmodified polycaprolactone (PCL) and the fluorinated polycaprolactone membrane prepared in the examples of the present invention. Among them, PCL-PTFOA (2 h) was the fluorinated polycaprolactone membrane prepared in Example 1, PCL-PTFOA (4 h) was the fluorinated polycaprolactone membrane prepared in Example 2, and PCL-PTFOA (6 h) was the fluorinated polycaprolactone membrane prepared in Example 3, and PCL-PTFOA (8 h) was the fluorinated polycaprolactone membrane prepared in Example 4.

At room temperature, 0.5 g of the fluorine-containing alkyl polyacrylate block-modified polycaprolactone was dissolved in 10 g of dichloromethane to prepare the mass was 5% of the solution. The solution was poured into a watch glass and naturally dried at room temperature to form a film, which was a fluorinated polycaprolactone membrane. The OCAH 200 full-automatic micro-droplet wettability measuring instrument of American dataphysics company was used to test the contact angle of the polymer film to evaluate the surface wetting performance of the polymer. The test droplet with water, and the volume of the droplet was 3 μL. The average contact angle of the test was 108.0±0.8° for five times (the contact angle of the unmodified polycaprolactone to water was 96.8±1.0°; see FIG. 13).

Example 2

(1) Hydroxylation of Polycaprolactone Terminal

Dissolved the 50.0 g of PCL with the molecular weight of 80,000 into the 520 g of 1,4-dioxane at 37° C., added 49 g of 6-amino-1-hexanol under nitrogen protection, and the reaction was performed for 12 hours. After the reaction was completed, the reaction solution was slowly added to 1050 g of anhydrous ethanol under constant stirring to precipitate a solid. After filtration, the filter cake was washed for 3 times with 100 g of the absolute ethanol and dried under vacuum at 37° C. for 24 h to obtain 37.9 g of the product with the 75.8% of yield. The molecular weight of the product was measured to be 67500.

(2) Carboxylation of Polycaprolactone Terminal

After stirred and dissolved 25.0 g of the hydroxyl-terminated polycaprolactone (PCL-OH) prepared above and 29.2 g of succinic anhydride, and 510 g of 1,4-dioxane. Added 9.88 g of anhydrous potassium carbonate ($K_2CO_3$) and 8.75 g of 4-dimethylaminopyridine (DMAP), and the reaction was carried out at room temperature under nitrogen for 4 h. After the reaction was completed, filtration was performed, and 15 g of acetic acid was added to the filtrate. The solution was added to 990 g of deionized water to precipitate a solid. After filtration, the filter cake was washed with 120 g of anhydrous ethanol for 3 times, and dried under vacuum at 37° C. for 24 h to obtain 21.1 g of the product with the 84.4% of yield. The molecular weight of the product was measured to be 67700.

(3) Preparation of Hydroxyl-Terminated Poly (1H, 1H, 2H, 2H-Tridecylfluorooctyl Acrylate) by ATRP Method The 423 μg of ethylene glycol bromoisobutyrate and the 645 μg of pentamethyldiethylenetriamine (PMDETA) were dissolved in 65 g of 2-butanone. After dissolving, 0.4 g of cuprous bromide is added, and under nitrogen protection at 40° C. The reaction was stirred for 15 min to obtain a catalyst. Added 63.5 g of 1H, 1H, 2H, 2H-tridecylfluorooctyl acrylate (TFOA), heated to 78° C., and reacted for 4 hours. After the reaction was completed, 310 g of THF and 105 g of phenylenedimethylene were added and passed through the neutral alumina column (200 to 300 mesh) to obtain the pale yellow clear solution. The solvent was removed by rotary distillation under reduced pressure at 65° C., and then the crude product was added to 960 g of anhydrous methanol to precipitate the solid, which was filtered, washed with 150 g of n-hexane for 3 times, and dried under vacuum at 55° C. for 24 hours to obtain 56.2 g of the hydroxyl-terminated fluoro-acrylate polymer, and the 88.5% of yield.

(4) Esterification to Prepare Block Polymers

Figure 3:
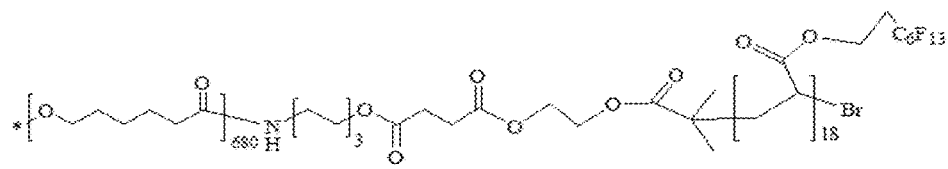
FIG. 3 shows the schematic structural diagram of the fluorinated polycaprolactone of Example 2.

Dissolve 7.1 g of carboxyl-terminated polycaprolactone (PCL-COOH) in 85 g of anhydrous THF in a three-necked flask at room temperature, added 4.8 g of N, N'-carbonyldiimidazole (CDI), and protected it at 30° C. under nitrogen reacted for 2 h. The 0.5 g of hydroxyl-terminated poly (1H, 1H, 2H, 2H-tridecylfluorooctyl acrylate) was dissolved in 32 g of phenylenedimethylene to prepare the solution, and the solution was added to a three-necked flask. The reaction mixture was reacted at 50 to 55° C. for 6 h. After the reaction, the reaction solution was poured into 310 g of n-hexane to precipitate a crude product, which was filtered, washed with 45 g of anhydrous ethanol for 3 times, and then dried under vacuum at 37° C. for 3 h to obtain the 6.8 g of fluorinated polycaprolactone, which was the fluorine-containing alkyl polyacrylate block-modified polycaprolactone, 89.5% of the yield. The molecular weight of the product was measured to be 77000. The structural formula of the product was shown in FIG. 3.

(5) Hydrophobicity Test

At room temperature, 0.5 g of the fluorine-containing alkyl polyacrylate block-modified polycaprolactone was dissolved in 10 g of tetrahydrofuran(THF) to prepare the mass was 5% of the solution. The solution was poured into a watch glass and naturally dried at room temperature to form a film, which was a fluorinated polycaprolactone membrane. The OCAH 200 full-automatic micro-droplet wettability measuring instrument of American dataphysics company was used to test the contact angle of the polymer film to evaluate the surface wetting performance of the polymer. The test droplet with water, and the volume of the droplet was 3 μL. The average contact angle of the test was 116.0±1.2° for five times, saw the FIG. 13; after undergoing the enzyme-catalyzed degradation for 72 hours, 87.9% was degraded.

Example 3

(1) The Procedures of Hydroxylation and Carboxylation of Polycaprolactone Terminal were the Same with Example 1.

(2) Preparation of Hydroxyl-Terminated Poly (1H, 1H, 2H, 2H-Tridecylfluorooctyl Acrylate) by ATRP Method The 418 μg of ethylene glycol bromoisobutyrate and the 620 μg of pentamethyldiethylenetriamine (PMDETA) were dissolved in 60 g of 2-butanone. After dissolving, 0.6 g of cuprous bromide is added, and under nitrogen protection at 40° C. The reaction was stirred for 15 min to obtain a catalyst. Added 65.6 g of 1H, 1H, 2H, 2H-tridecylfluorooctyl acrylate (TFOA), heated to 80° C., and reacted for 6 hours. After the reaction was completed, 360 g of THF and 120 g of trifluorotoluene were added and passed through the neutral alumina column (200 to 300 mesh) to obtain the pale yellow clear solution. The solvent was removed by rotary distillation under reduced pressure at 65° C., and then the crude product was added to 1050 g of anhydrous methanol to precipitate the solid, which was filtered, washed with 150 g of n-hexane for 3 times, and dried under vacuum at 55° C. for 24 hours to obtain 55.3 g of the hydroxyl-terminated fluoro-acrylate polymer, and the 84.3% of yield.

(3) Esterification to Prepare Block Polymers

Figure 4:
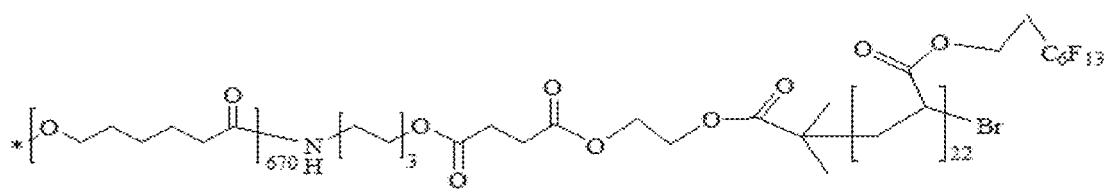
FIG. 4 shows the schematic structural diagram of the fluorinated polycaprolactone of Example 3.

Dissolve 7.0 g of carboxyl-terminated polycaprolactone (PCL-COOH) in 100 g of anhydrous THF in a three-necked flask at room temperature, added 5.1 g of N, N'-carbonyldiimidazole (CDI), and protected it at 30° C. under nitrogen reacted for 2 h. The 0.7 g of hydroxyl-terminated poly (1H, 1H, 2H, 2H-tridecylfluorooctyl acrylate) was dissolved in 40 g of trifluorotoluene to prepare the solution, and the solution was added to a three-necked flask. The reaction mixture was reacted at 51 to 55° C. for 4 h. After the reaction, the reaction solution was poured into 350 g of n-hexane to precipitate a crude product, which was filtered, washed with 45 g of anhydrous ethanol for 3 times, and then dried under vacuum at 37° C. for 3 h to obtain the 7.1 g of fluorinated polycaprolactone, which was the fluorine-containing alkyl polyacrylate block-modified polycaprolactone, 92.2% of the yield. The molecular weight of the product was measured to be 78700. The structural formula of the product was shown in FIG. 4.

(4) Hydrophobicity Test

At room temperature, 0.5 g of the fluorine-containing alkyl polyacrylate block-modified polycaprolactone was dissolved in 10 g of tetrahydrofuran to prepare the mass was 5% of the solution. The solution was poured into a watch glass and naturally dried at room temperature to form a film, which was a fluorinated polycaprolactone membrane. The OCAH 200 full-automatic micro-droplet wettability measuring instrument of American Dataphysics Company was used to test the contact angle of the polymer film to evaluate the surface wetting performance of the polymer. The test droplet with water, and the volume of the droplet was 3 μL. The average contact angle of the test was 128.4±1.3° for five times, saw the FIG. 13.

Example 4

(1) The Procedures of Hydroxylation and Carboxylation of Polycaprolactone Terminal were the Same with Example 2.

(2) Preparation of Hydroxyl-Terminated Poly (1H, 1H, 2H, 2H-Tridecylfluorooctyl Acrylate) by ATRP Method The 490 μg of ethylene glycol bromoisobutyrate and the 655 μg of pentamethyldiethylenetriamine (PMDETA) were dissolved in 605 g of 2-butanone. After dissolving, 0.5 g of cuprous bromide is added, and under nitrogen protection at 40° C. The reaction was stirred for 15 min to obtain a catalyst. Added 66.1 g of 1H, 1H, 2H, 2H-tridecylfluorooctyl acrylate (TFOA), heated to 80° C., and reacted for 8 hours. After the reaction was completed, 380 g of THF and 155 g of bis-(trifluoromethyl) benzene were added and passed through the neutral alumina column (200 to 300 mesh) to obtain the pale yellow clear solution. The solvent was removed by rotary distillation under reduced pressure at 65° C., and then the crude product was added to 1050 g of anhydrous methanol to precipitate the solid, which was filtered, washed with 150 g of n-hexane for 3 times, and dried under vacuum at 55° C. for 24 hours to obtain 57.3 g of the hydroxyl-terminated fluoro-acrylate polymer, and the 86.7% of yield.

(3) Esterification to Prepare Block Polymers

Figure 5:
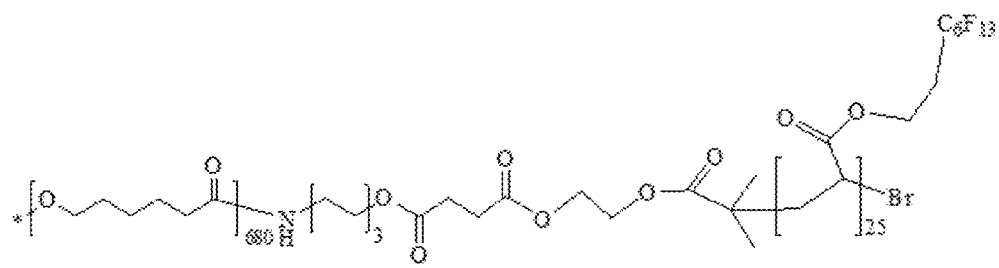
FIG. 5 shows the schematic structural diagram of the fluorinated polycaprolactone of Example 4.

Dissolve 7.2 g of carboxyl-terminated polycaprolactone (PCL-COOH) in 80 g of anhydrous THF in a three-necked flask at room temperature, added 4.9 g of N,N'-carbonyldiimidazole (CDI), and protected it at 30° C. under nitrogen reacted for 2 h. The 0.55 g of hydroxyl-terminated poly (1H, 1H, 2H, 2H-tridecylfluorooctyl acrylate) was dissolved in 30 g of bis-(trifluoromethyl)benzene to prepare the solution, and the solution was added to a three-necked flask. The reaction mixture was reacted at 50 to 54° C. for 4 h. After the reaction, the reaction solution was poured into 310 g of n-hexane to precipitate a crude product, which was filtered, washed with 45 g of anhydrous ethanol for 3 times, and then dried under vacuum at 37° C. for 3 h to obtain the 6.3 g of fluorinated polycaprolactone, which was the fluorine-containing alkyl polyacrylate block-modified polycaprolactone, 81.3% of the yield. The molecular weight of the product was measured to be 79900. The structural formula of the product was shown in FIG. 5.

(4) Hydrophobicity Test

At room temperature, 0.5 g of the fluorine-containing alkyl polyacrylate block-modified polycaprolactone was dissolved in 10 g of dichloromethane to prepare the mass was 5% of the solution. The solution was poured into a watch glass and naturally dried at room temperature to form a film, which was a fluorinated polycaprolactone membrane. The OCAH 200 full-automatic micro-droplet wettability measuring instrument of American dataphysics company was used to test the contact angle of the polymer film to evaluate the surface wetting performance of the polymer. The test droplet with water, and the volume of the droplet was 3 μL. The average contact angle of the test was 127.3±0.8° for five times, see FIG. 13.

Example 5

(1) Hydroxylation of Polycaprolactone Terminal

Dissolved the 125.0 g of PCL with the molecular weight of 50,000 into the 850 g of 1,4-dioxane at 37° C., added 25 g of 6-amino-1-hexanol under nitrogen protection, and the reaction was performed for 12 hours. After the reaction was completed, the reaction solution was slowly added to 650 g of anhydrous ethanol under constant stirring to precipitate a solid. After filtration, the filter cake was washed for 3 times with 60 g of the absolute ethanol and dried under vacuum at 37° C. for 24 h to obtain 87.8 g of the product with the 70.2% of yield. The molecular weight of the product was measured to be 50500.

(2) Carboxylation of Polycaprolactone Terminal

After stirred and dissolved 62.5 g of the hydroxyl-terminated polycaprolactone (PCL-OH) prepared above and 29.5 g of succinic anhydride, and 620 g of 1,4-dioxane. Added 9.98 g of anhydrous potassium carbonate ($K_2CO_3$) and 8.97 g of 4-dimethylaminopyridine (DMAP), and the reaction was carried out at room temperature under nitrogen for 4 h. After the reaction was completed, filtration was performed, and 15 g of acetic acid was added to the filtrate. The solution was added to 1020 g of deionized water to precipitate a solid. After filtration, the filter cake was washed with 120 g of anhydrous ethanol for 3 times, and dried under vacuum at 37° C. for 24 h to obtain 48.8 g of the product with the 78.0% of yield. The molecular weight of the product was measured to be 49800.

(3) Preparation of Hydroxyl-Terminated Poly (1H, 1H, 3H-Hexafluorobutyl Methacrylate) by ATRP Method The 453 µg of ethylene glycol bromoisobutyrate and the 662 µg of pentamethyldiethylenetriamine (PMDETA) were dissolved in 65 g of 2-butanone. After dissolving, 0.6 g of cuprous bromide is added, and under nitrogen protection at 40° C. The reaction was stirred for 15 min to obtain a catalyst. Added 67.1 g of 1H, 1H, 3H-hexafluorobutyl methacrylate (HFBMA), heated to 80° C., and reacted for 12 hours. After the reaction was completed, 350 g of THF and 115 g of trifluorotoluene were added and passed through the neutral alumina column (200 to 300 mesh) to obtain the pale yellow clear solution. The solvent was removed by rotary distillation under reduced pressure at 55° C., and then the crude product was added to 1020 g of anhydrous methanol to precipitate the solid, which was filtered, washed with 150 g of n-hexane for 3 times, and dried under vacuum at 55° C. for 24 hours to obtain 61.8 g of the hydroxyl-terminated poly (1H, 1H, 3H-hexafluorobutyl methacrylate), and the 92.1% of yield.

(4) Esterification to Prepare Block Polymers

Figure 6:
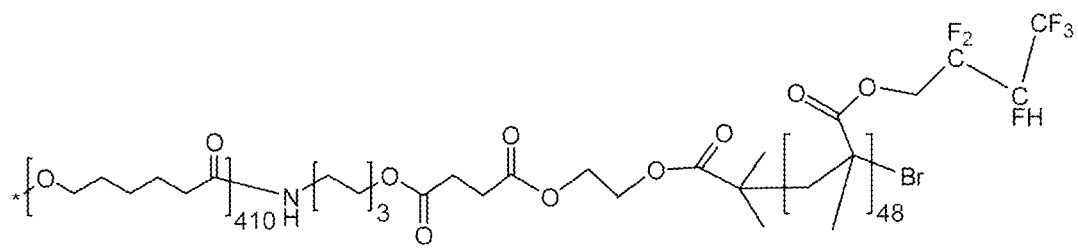
FIG. 6 shows the schematic structural diagram of the fluorinated polycaprolactone of Example 5.

Dissolve 45.1 g of carboxyl-terminated polycaprolactone (PCL-COOH) in 255 g of anhydrous THF in a three-necked flask at room temperature, added 5.1 g of N,N'-carbonyl-diimidazole (CDI), and protected it at 30° C. under nitrogen reacted for 2 h. The 0.6 g of hydroxyl-terminated poly (1H, 1H, 3H-hexafluorobutyl methacrylate) was dissolved in 32 g of trifluorotoluene to prepare the solution, and the solution was added to a three-necked flask. The reaction mixture was reacted at 50 to 55° C. for 6 h. After the reaction, the reaction solution was poured into 330 g of n-hexane to precipitate a crude product, which was filtered, washed with 45 g of anhydrous ethanol for 3 times, and then dried under vacuum at 37° C. for 3 h to obtain the 42.0 g of fluorinated polycaprolactone, which was the fluorine-containing alkyl polyacrylate block-modified polycaprolactone, 92.0% of the yield. The molecular weight of the product was measured to be 59100. The structural formula of the product was shown in FIG. 6.

(5) Hydrophobicity Test

At room temperature, 0.5 g of the fluorine-containing alkyl polyacrylate block-modified polycaprolactone was dissolved in 10 g of tetrahydrofuran to prepare the mass was 5% of the solution. The solution was poured into a watch glass and naturally dried at room temperature to form a film, which was a fluorinated polycaprolactone membrane. The OCAH 200 full-automatic micro-droplet wettability measuring instrument of American Dataphysics Company was used to test the contact angle of the polymer film to evaluate the surface wetting performance of the polymer. The test droplet with water, and the volume of the droplet was 3 µL. The average contact angle of the test was 109.0±1.0° for five times.

Example 6

(1) The Procedures of Hydroxylation and Carboxylation of Polycaprolactone Terminal were the Same with Example 5.

(2) Preparation of Hydroxyl-Terminated Poly (1H, 1H, 3H-Hexafluorobutyl Methacrylate) by ATRP Method The 450 µg of ethylene glycol bromoisobutyrate and the 666 µg of pentamethyldiethylenetriamine (PMDETA) were dissolved in 65 g of 2-butanone. After dissolving, 0.5 g of cuprous bromide is added, and under nitrogen protection at 40° C. The reaction was stirred for 15 min to obtain a catalyst. Added 66.8 g of 1H, 1H, 3H-hexafluorobutyl methacrylate (HFBMA), heated to 80° C., and reacted for 5 hours. After the reaction was completed, 345 g of THF and 110 g of trifluorotoluene were added and passed through the neutral alumina column (200 to 300 mesh) to obtain the pale yellow clear solution. The solvent was removed by rotary distillation under reduced pressure at 55° C., and then the crude product was added to 1010 g of anhydrous methanol to precipitate the solid, which was filtered, washed with 150 g of n-hexane for 3 times, and dried under vacuum at 55° C. for 24 hours to obtain 58.1 g of the hydroxyl-terminated poly (1H, 1H, 3H-hexafluorobutyl methacrylate), and the 87.0% of yield.

(3) Esterification to Prepare Block Polymers

Figure 7:
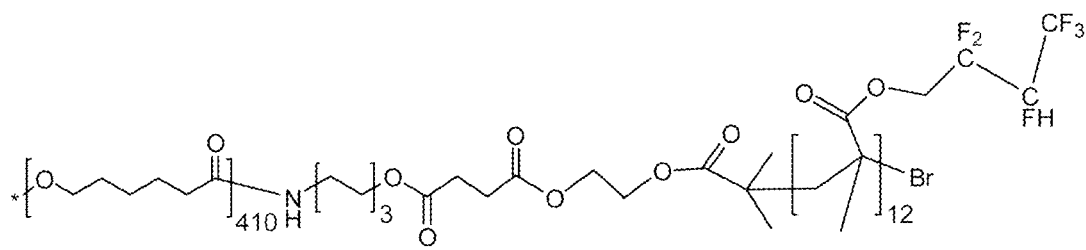
FIG. 7 shows the schematic structural diagram of the fluorinated polycaprolactone of Example 6.

Dissolve 45.3 g of carboxyl-terminated polycaprolactone (PCL-COOH) in 285 g of anhydrous THF in a three-necked flask at room temperature, added 5.2 g of N,N'-carbonyl-diimidazole (CDI), and protected it at 30° C. under nitrogen reacted for 2 h. The 0.4 g of hydroxyl-terminated poly (1H, 1H, 3H-hexafluorobutyl methacrylate) was dissolved in 31 g of trifluorotoluene to prepare the solution, and the solution was added to a three-necked flask. The reaction mixture was reacted at 52 to 55° C. for 6 h. After the reaction, the reaction solution was poured into 320 g of n-hexane to precipitate a crude product, which was filtered, washed with 45 g of anhydrous ethanol for 3 times, and then dried under vacuum at 37° C. for 3 h to obtain the 41.4 g of fluorinated polycaprolactone, which was the fluorine-containing alkyl polyacrylate block-modified polycaprolactone, 90.5% of the yield. The molecular weight of the product was measured to be 49120. The structural formula of the product was shown in FIG. 7.

(4) Hydrophobicity Test

At room temperature, 0.5 g of the fluorine-containing alkyl polyacrylate block-modified polycaprolactone was dissolved in 10 g of tetrahydrofuran to prepare the mass was 5% of the solution. The solution was poured into a watch glass and naturally dried at room temperature to form a film, which was a fluorinated polycaprolactone membrane. The OCAH 200 full-automatic micro-droplet wettability measuring instrument of American Dataphysics Company was used to test the contact angle of the polymer film to evaluate the surface wetting performance of the polymer. The test droplet with water, and the volume of the droplet was 3 µL. The average contact angle of the test was 106.0±0.8° for five times; after undergoing the enzyme-catalyzed degradation for 72 hours, 86.2% was degraded.

Example 7

(1) Preparation of Hydroxyl-Terminated Poly (1H, 1H, 2H, 2H-Tridecylfluorooctyl Acrylate) by ATRP Method The 210 μg of ethylene glycol bromoisobutyrate and the 320 μg of pentamethyldiethylenetriamine (PMDETA) were dissolved in 30 g of 1,3-(bistrifluoromethyl)benzene. After dissolving, 0.2 g of cuprous bromide is added, and under nitrogen protection at 40° C. The reaction was stirred for 15 min to obtain a catalyst. Added 32.5 g of 1H, 1H, 2H, 2H-tridecylfluorooctyl acrylate (TFOA), heated to 80° C., and reacted for 24 hours. After the reaction was completed, 250 g of 1,3-(bistrifluoromethyl)benzene and passed through the neutral alumina column (200 to 300 mesh) to obtain the pale yellow clear solution. The solvent was removed by rotary distillation under reduced pressure at 75° C., and then the crude product was added to 510 g of anhydrous methanol to precipitate the solid, which was filtered, washed with 60 g of n-hexane for 3 times, and dried under vacuum at 55° C. for 24 hours to obtain 29.6 g of the hydroxyl-terminated fluoro-acrylate polymer, the molecular weight of the product was measured to be 6030, and the 91.2% of yield.

(2) Carboxylation of Polycaprolactone Terminal

Dissolved the 125.0 g of PCL with the molecular weight of 4500 into the 850 g of 1,4-dioxane at 37° C., added 25 g of 6-amino-1-hexanol under nitrogen protection, and the reaction was performed for 12 hours. After the reaction was completed, the reaction solution was slowly added to 650 g of anhydrous ethanol under constant stirring to precipitate a solid. After filtration, the filter cake was washed for 3 times with 60 g of the absolute ethanol and dried under vacuum at 37° C. for 24 h to obtain hydroxyl-terminated polycaprolactone, which had 76.2% of yield. The molecular weight of the product was measured to be 4000.

After stirred and dissolved 25.0 g of the hydroxyl-terminated polycaprolactone (PCL-OH) prepared above and 0.7 g of succinic anhydride, and 110 g of 1,4-dioxane. Added 1.9 g of anhydrous potassium carbonate ($K_2CO_3$) and 2.5 g of 4-dimethylaminopyridine (DMAP), and the reaction was carried out at room temperature under nitrogen for 4 h. After the reaction was completed, filtration was performed, and 4 g of acetic acid was added to the filtrate. The solution was added to 300 g of deionized water to precipitate a solid. After filtration, the filter cake was washed with 250 g of anhydrous ethanol for 3 times, and dried under vacuum at 37° C. for 24 h to obtain 18.5 g of the product with the 74.1% of yield. The molecular weight of the product was measured to be 4520.

(3) Esterification to Prepare Block Polymers

Figure 8:
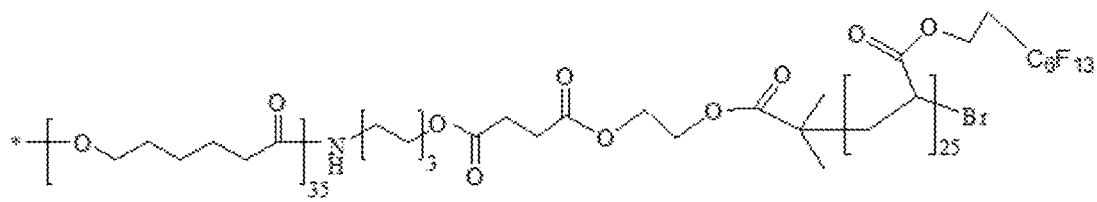
FIG. 8 shows the schematic structural diagram of the fluorinated polycaprolactone of Example 7.

Dissolve 4.2 g of carboxyl-terminated polycaprolactone (PCL-COOH) in 45 g of anhydrous THF in a three-necked flask at room temperature, added 0.3 g of N,N'-carbonyl-diimidazole (CDI), and protected it at 30° C. under nitrogen reacted for 2 h. The 5.9 g of hydroxyl-terminated poly (1H, 1H, 2H, 2H-tridecylfluorooctyl acrylate) was dissolved in 65 g of 1,3-(bistrifluoromethyl)benzene to prepare the solution, and the solution was added to a three-necked flask. The reaction mixture was reacted at 50 to 55° C. for 6 h. After the reaction, the reaction solution was poured into 350 g of n-hexane to precipitate a crude product, which was filtered, washed with 50 g of anhydrous ethanol for 3 times, and dried under vacuum at 37° C. for 3 h to obtain the 7.1 g of the polycaprolactone block modified fluoroalkyl polymer (PCL4000-PTFOA), 70.3% of the yield. The molecular weight of the product was measured to be 10080. The structural formula of the product was shown in FIG. 8.

(4) Degradability Test

Dissolved 2 g of polycaprolactone block modified fluoroalkyl polymer (PCL4000-PTFOA) in 20 mL of tetrahydrofuran, and then transferred to a watch glass, placed horizontally in an oven, and dried at 40° C. for 24 hours to obtain the fluorinated polycaprolactone membrane. The membrane was cut into a round sheet with the diameter of about 10 mm and weight of about 0.04 g. The cut wafer was washed in ethanol to remove impurities on the surface of the membrane. Finally, the wafer was washed with deionized water, placed in a vacuum oven, and dried at 37° C. for 24 hours to obtain the clean wafer. Reserved for degradation.

Weigh the prepared slices separately and placed them in the numbered wells of the plate, and then used the pipette to transfer 3 mL of 8 U/mL (0.027 mg/mL) of *Aspergillus oryzae* lipase PBS (pH=7.2 to 7.4) solution, added to the corresponding wells of the culture plate. Each disc was completely immersed in the enzyme solution, and three samples were set at each degradation time point to reduce accidental errors. After they were degraded for 12 h, 24 h, 48 h, and 72 h, they were taken out and washed with a large amount of deionized water to remove soluble impurities on the surface. Subsequently, it was placed in a vacuum oven, dried at 37° C. for 24 hours, and weighed and recorded.

The formula for calculating the weight loss rate was as follows, this formula was also used in other examples and comparative:

$$\text{Weight loss rate (\%)} = (W_0 - W_1)/(W_0)$$

The $W_0$ was the mass before degradation of the sheet, and the $W_i$ was the average mass of the three samples after degradation.

The weight loss rates of PCL4000-PTFOA samples measured respectively for 12 hours, 24 hours, 48 hours, and 72 hours was 2.1%, 22.3%, 43.5%, and 77.2%. After 72 hours of enzyme-catalyzed degradation of polycaprolactone block modified fluoroalkyl polymer products, 77.2% was degraded. The average contact angle obtained after five tests was 119.0±1.1°.

Example 8

(1) Preparation of Hydroxyl-Terminated Poly (1H, 1H, 2H, 2H-Tridecylfluorooctyl Acrylate) by ATRP Method of Example 2.

(2) Carboxylation of Polycaprolactone Terminal

Dissolved the 125.0 g of PCL with the molecular weight of 7000 into the 850 g of 1,4-dioxane at 37° C., added 25 g of 6-amino-1-hexanol under nitrogen protection, and the reaction was performed for 12 hours. After the reaction was completed, the reaction solution was slowly added to 650 g of anhydrous ethanol under constant stirring to precipitate a solid. After filtration, the filter cake was washed for 3 times with 60 g of the absolute ethanol and dried under vacuum at 37° C. for 24 h to obtain hydroxyl-terminated polycaprolactone, which had 73.2% of yield. The molecular weight of the product was measured to be 6100.

After stirred and dissolved 38.0 g of the hydroxyl-terminated polycaprolactone (PCL-OH) prepared above and 0.8 g of succinic anhydride, and 150 g of 1,4-dioxane. Added 1.8 g of anhydrous potassium carbonate ($K_2CO_3$) and 2.6 g of 4-dimethylaminopyridine (DMAP), and the reaction was carried out at room temperature under nitrogen for 4 h. After the reaction was completed, filtration was performed, and 5 g of acetic acid was added to the filtrate. The solution was added to 300 g of deionized water to precipitate a solid. After filtration, the filter cake was washed with 250 g of anhydrous ethanol for 3 times, and dried under vacuum at 37° C. for 24 h to obtain 30.4 g of the product with the 80.2% of yield. The molecular weight of the product was measured to be 6700.

(3) Esterification to Prepare Block Polymers

Figure 9:
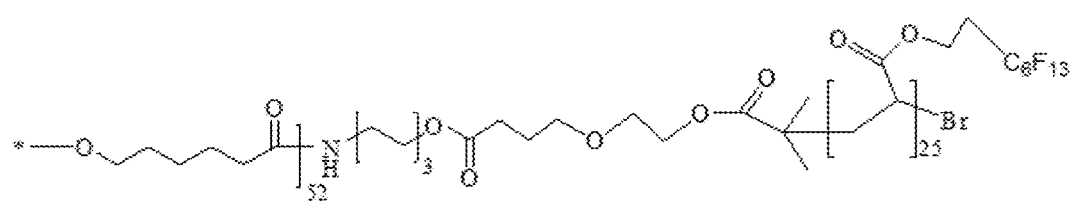
FIG. 9 shows the schematic structural diagram of the fluorinated polycaprolactone of Example 8.

Dissolve 6.5 g of carboxyl-terminated polycaprolactone (PCL-COOH) in 55 g of anhydrous THF in a three-necked flask at room temperature, added 0.4 g of N,N'-carbonyldiimidazole (CDI), and protected it at 30° C. under nitrogen reacted for 2 h. The 5.9 g of hydroxyl-terminated poly (1H, 1H, 2H, 2H-tridecylfluorooctyl acrylate) was dissolved in 65 g of 1,3-(bistrifluoromethyl) benzene to prepare the solution, and the solution was added to a three-necked flask. The reaction mixture was reacted at 50 to 55° C. for 6 h. After the reaction, the reaction solution was poured into 350 g of n-hexane to precipitate a crude product, which was filtered, washed with 50 g of anhydrous ethanol for 3 times, and then dried under vacuum at 37° C. for 3 h to obtain the 9.1 g of the polycaprolactone block modified fluoroalkyl polymer (PCL6000-PTFOA), 73.4% of the yield. The molecular weight of the product was measured to be 12110. The structural formula of the product was shown in FIG. 9.

(4) Degradability Test

Dissolved 2 g of polycaprolactone block modified fluoroalkyl polymer (PCL6000-PTFOA) in 20 mL of tetrahydrofuran, and then transferred to a watch glass, placed horizontally in an oven, and dried at 40° C. for 24 hours to obtain the fluorinated polycaprolactone membrane. The membrane was cut into a round sheet with the diameter of about 10 mm and weight of about 0.04 g. The cut wafer was washed in ethanol to remove impurities on the surface of the membrane. Finally, the wafer was washed with deionized water, placed in a vacuum oven, and dried at 37° C. for 24 hours to obtain the clean wafer. Reserved for degradation.

Weigh the prepared slices separately and placed them in the numbered wells of the plate, and then used the pipette to transfer 3 mL of 8 U/mL (0.027 mg/mL) of *Aspergillus oryzae* lipase PBS (pH=7.2 to 7.4) solution, added to the corresponding wells of the culture plate. Each disc was completely immersed in the enzyme solution, and three samples were set at each degradation time point to reduce accidental errors. After they were degraded for 12 h, 24 h, 48 h, and 72 h, they were taken out and washed with a large amount of deionized water to remove soluble impurities on the surface. Subsequently, it was placed in a vacuum oven, dried at 37° C. for 24 hours, and weighed and recorded.

The weight loss rates of PCL6000-PTFOA samples measured respectively for 12 hours, 24 hours, 48 hours, and 72 hours was 1.9%, 21.8%, 43.8%, and 80.2%. After 72 hours of enzyme-catalyzed degradation of polycaprolactone block modified fluoroalkyl polymer products, 80.2% was degraded. The average contact angle obtained after five tests was 123.2±1.1°.

Example 9

(1) Preparation of Hydroxyl-Terminated Poly (1H, 1H, 2H, 2H-Tridecylfluorooctyl Acrylate) by ATRP Method The 220 μg of ethylene glycol bromoisobutyrate and the 300 μg of pentamethyldiethylenetriamine (PMDETA) were dissolved in 35 g of 1,3-(bistrifluoromethyl)benzene. After dissolving, 0.2 g of cuprous bromide is added, and under nitrogen protection at 40° C. The reaction was stirred for 15 min to obtain a catalyst. Added 33.1 g of 1H, 1H, 2H, 2H-tridecylfluorooctyl acrylate (TFOA), heated to 80° C., and reacted for 28 hours. After the reaction was completed, 265 g of 1,3-(bistrifluoromethyl) benzene and passed through the neutral alumina column (200 to 300 mesh) to obtain the pale yellow clear solution. The solvent was removed by rotary distillation under reduced pressure at 78° C., and then the crude product was added to 500 g of anhydrous methanol to precipitate the solid, which was filtered, washed with 60 g of n-hexane for 3 times, and dried under vacuum at 65° C. for 24 hours to obtain 22.1 g of the hydroxyl-terminated fluoro-acrylate polymer, the molecular weight of the product was measured to be 6630, and the 66.7% of yield.

(2) Carboxylation of Polycaprolactone Terminal

Dissolved the 125.0 g of PCL with the molecular weight of 9800 into the 850 g of 1,4-dioxane at 37° C., added 25 g of 6-amino-1-hexanol under nitrogen protection, and the reaction was performed for 12 hours. After the reaction was completed, the reaction solution was slowly added to 650 g of anhydrous ethanol under constant stirring to precipitate a solid. After filtration, the filter cake was washed for 3 times with 60 g of the absolute ethanol and dried under vacuum at 37° C. for 24 h to obtain hydroxyl-terminated polycaprolactone, which had 72.2% of yield. The molecular weight of the product was measured to be 8210.

After stirred and dissolved 49.0 g of the hydroxyl-terminated polycaprolactone (PCL-OH) prepared above and 0.8 g of succinic anhydride, and 175 g of 1,4-dioxane. Added 1.9 g of anhydrous potassium carbonate ($K_2CO_3$) and 2.5 g of 4-dimethylaminopyridine (DMAP), and the reaction was carried out at room temperature under nitrogen for 4 h. After the reaction was completed, filtration was performed, and 6 g of acetic acid was added to the filtrate. The solution was added to 300 g of deionized water to precipitate a solid. After filtration, the filter cake was washed with 250 g of anhydrous ethanol for 3 times, and dried under vacuum at 37° C. for 24 h to obtain 37.0 g of the product with the 75.6% of yield. The molecular weight of the product was measured to be 8020.

(3) Esterification to Prepare Block Polymers

Figure 10:
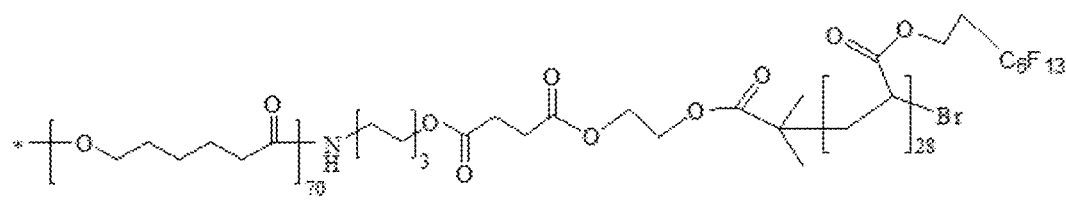
FIG. 10 shows the schematic structural diagram of the fluorinated polycaprolactone of Example 9.

Dissolve 8.4 g of carboxyl-terminated polycaprolactone (PCL-COOH) in 75 g of 1,3-(bistrifluoromethyl)benzene in a three-necked flask at room temperature, added 0.5 g of N, N'-carbonyldiimidazole (CDI), and protected it at 30° C. under nitrogen reacted for 2 h. The 5.8 g of hydroxyl-terminated poly (1H, 1H, 2H, 2H-tridecylfluorooctyl acrylate) was dissolved in 70 g of 1,3-(bistrifluoromethyl) benzene to prepare the solution, and the solution was added to a three-necked flask. The reaction mixture was reacted at 50 to 55° C. for 6 h. After the reaction, the reaction solution was poured into 350 g of n-hexane to precipitate a crude product, which was filtered, washed with 50 g of anhydrous ethanol for 3 times, and then dried under vacuum at 37° C. for 3 h to obtain the 9.2 g of the polycaprolactone block modified fluoroalkyl polymer (PCL8000-PTFOA), 65.0% of the yield. The molecular weight of the product was measured to be 15090. The structural formula of the product was shown in FIG. 10.

(4) Degradability Test

Dissolved 2 g of polycaprolactone block modified fluoroalkyl polymer (PCL8000-PTFOA) in 20 mL of tetrahydrofuran, and then transferred to a watch glass, placed horizontally in an oven, and dried at 40° C. for 24 hours to obtain the fluorinated polycaprolactone membrane. The membrane was cut into a round sheet with the diameter of about 10 mm and weight of about 0.04 g. The cut wafer was washed in ethanol to remove impurities on the surface of the membrane. Finally, the wafer was washed with deionized water, placed in a vacuum oven, and dried at 37° C. for 24 hours to obtain the clean wafer. Reserved for degradation.

Weigh the prepared slices separately and placed them in the numbered wells of the plate, and then used the pipette to transfer 3 mL of 8 U/mL (0.027 mg/mL) of *Aspergillus oryzae* lipase PBS (pH=7.2 to 7.4) solution, added to the corresponding wells of the culture plate. Each disc was completely immersed in the enzyme solution, and three samples were set at each degradation time point to reduce accidental errors. After they were degraded for 12 h, 24 h, 48 h, and 72 h, they were taken out and washed with a large amount of deionized water to remove soluble impurities on the surface. Subsequently, it was placed in a vacuum oven, dried at 37° C. for 24 hours, and weighed and recorded.

The weight loss rates of PCL8000-PTFOA samples measured respectively for 12 hours, 24 hours, 48 hours, and 72 hours was 1.9%, 22.9%, 44.5%, and 84.8%. After 72 hours of enzyme-catalyzed degradation of polycaprolactone block modified fluoroalkyl polymer products, 84.8% was degraded.

Example 10

(1) Preparation of Hydroxyl-Terminated Poly (1H, 1H, 3H-Hexafluorobutyl Methacrylate) by ATRP Method The 453 μg of ethylene glycol bromoisobutyrate and the 662 μg of pentamethyldiethylenetriamine (PMDETA) were dissolved in 65 g of 2-butanone. After dissolving, 0.6 g of cuprous bromide is added, and under nitrogen protection at 40° C. The reaction was stirred for 15 min to obtain a catalyst. Added 67.1 g of 1H, 1H, 3H-hexafluorobutyl methacrylate (HFBDA), heated to 80° C., and reacted for 28 hours. After the reaction was completed, 350 g of THF and 115 g of benzotrifluoride were added and passed through the neutral alumina column (200 to 300 mesh) to obtain the pale yellow clear solution. The solvent was removed by rotary distillation under reduced pressure at 55° C., and then the crude product was added to 1020 g of anhydrous methanol to precipitate the solid, which was filtered, washed with 150 g of n-hexane for 3 times, and dried under vacuum at 55° C. for 24 hours to obtain 61.8 g of the hydroxyl-terminated poly (1H, 1H, 3H-hexafluorobutyl methacrylate). The molecular weight of the product was measured to be 3950, and the 92.1% of yield.

(2) Carboxylation of Polycaprolactone Terminal

After stirred and dissolved the 329.0 g of PCL-OH was prepared with the molecular weight of 50500 (PCL, prepared with Example 5) into the 0.8 g of succinic anhydride, and 152 g of 1,4-dioxane. Added 1.9 g of anhydrous potassium carbonate ($K_2CO_3$) and 2.3 g of 4-dimethylaminopyridine (DMAP), and the reaction was carried out at room temperature under nitrogen for 4 h. After the reaction was completed, filtration was performed, and 4 g of acetic acid was added to the filtrate. The solution was added to 300 g of deionized water to precipitate a solid. After filtration, the filter cake was washed with 250 g of anhydrous ethanol for 3 times, and dried under vacuum at 37° C. for 24 h to obtain 245.5 g of the product with the 74.6% of yield. The molecular weight of the product was measured to be 49900.

(3) Esterification to Prepare Block Polymers

Figure 11:
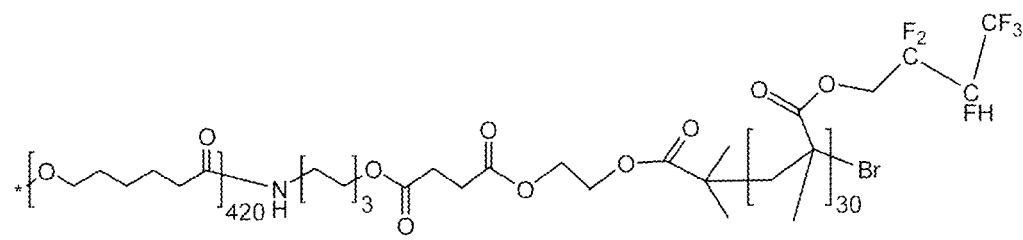
FIG. 11 shows the schematic structural diagram of the fluorinated polycaprolactone of Example 10.

Dissolve 50.1 g of the molecular weight of 49900 of the hydroxyl-terminated polycaprolactone in 550 g of 1,3-(bistrifluoromethyl) benzene in a three-necked flask at room temperature, added 0.5 g of N, N'-carbonyldiimidazole (CDI), and protected it at 30° C. under nitrogen reacted for 2 h. The 5.8 g of hydroxyl-terminated poly (1H, 1H, 3H-hexafluorobutyl methacrylate) was dissolved in 71 g of 1,3-(bistrifluoromethyl)benzene to prepare the solution, and the solution was added to a three-necked flask. The reaction mixture was reacted at 50 to 55° C. for 6 h. After reaction, the reaction solution was poured into 860 g of n-hexane to precipitate a crude product, which was filtered, washed with 200 g of anhydrous ethanol for 3 times, and then dried under vacuum at 37° C. for 3 h to obtain the 79.8 g of the polycaprolactone block modified fluoroalkyl polymer (PCL50000-PTFDA), 80.1% of the yield. The molecular weight of the product was measured to be 50230. The structural formula of the product was shown in FIG. 11.

(4) Degradability Test was the Same as Example 7

The weight loss rates of PCL50000-PTFDA samples measured respectively for 12 hours, 24 hours, 48 hours, and 72 hours was 2.2%, 23.4%, 41.2%, and 86.3%. After 72 hours of enzyme-catalyzed degradation of polycaprolactone block modified fluoroalkyl polymer products, 86.3% was degraded.

Comparative Example (1) Preparation of Hydroxyl-Terminated Poly (1H, 1H, 2H, 2H-Tridecylfluorooctyl Acrylate) by ATRP Method was the Same as in Example 7.

(2) Carboxylation of Polycaprolactone Terminal

Dissolved the 125.0 g of PCL with the molecular weight of 2300 into the 850 g of 1,4-dioxane at 37° C., added 25 g of 6-amino-1-hexanol under nitrogen protection, and the reaction was performed for 12 hours. After the reaction was completed, the reaction solution was slowly added to 650 g of anhydrous ethanol under constant stirring to precipitate a solid. After filtration, the filter cake was washed for 3 times with 60 g of the absolute ethanol and dried under vacuum at 37° C. for 24 h to obtain hydroxyl-terminated polycaprolactone, which had 75.6% of yield. The molecular weight of the product was measured to be 2000.

After stirred and dissolved the 12.4 g of the PCL-OH into the 0.8 g of succinic anhydride and 90 g of 1,4-dioxane. Added 1.6 g of anhydrous potassium carbonate ($K_2CO_3$) and 2.1 g of 4-dimethylaminopyridine (DMAP), and the reaction was carried out at room temperature under nitrogen for 6 h. After the reaction was completed, filtration was performed, and 3 g of acetic acid was added to the filtrate. The solution was added to 200 g of deionized water to precipitate a solid. After filtration, the filter cake was washed with 150 g of anhydrous ethanol for 3 times, and dried under vacuum at 37° C. for 24 h to obtain 6.3 g of the product with the 51.2% of yield. The molecular weight of the product was measured to be 1920.

(3) Esterification to Prepare Block Polymers

Figure 12:
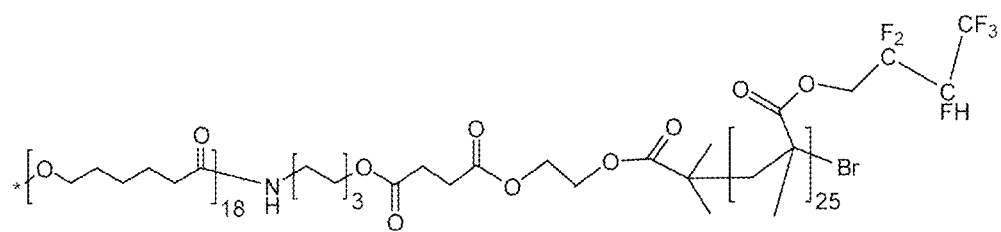
FIG. 12 shows the schematic structural diagram of the fluorinated polycaprolactone of Comparative 1.

Dissolve 2.0 g of carboxyl-terminated polycaprolactone (PCL-COOH) in 35 g of anhydrous THF in a three-necked flask at room temperature, added 0.3 g of N, N'-carbonyldiimidazole (CDI), and protected it at 30° C. under nitrogen reacted for 2 h. The 5.5 g of hydroxyl-terminated poly (1H, 1H, 2H, 2H-tridecylfluorooctyl acrylate) was dissolved in 65 g of 1,3-(bistrifluoromethyl)benzene to prepare the solution, and the solution was added to a three-necked flask. The reaction mixture was reacted at 50 to 55° C. for 6 h. After the reaction, the reaction solution was poured into 290 g of n-hexane to precipitate a crude product, which was filtered, washed with 50 g of anhydrous ethanol for 3 times, and then dried under vacuum at 37° C. for 3 h to obtain the 6.8 g of the polycaprolactone block modified fluoroalkyl polymer (PCL2000-PTFOA), 91.1% of the yield. The molecular weight of the product was measured to be 8150. The structural formula of the product was shown in FIG. 12.

(4) Degradability Test

Dissolved 2 g of polycaprolactone block modified fluoroalkyl polymer (PCL2000-PTFOA) in 20 mL of tetrahydrofuran, and then transferred to a watch glass, placed horizontally in an oven, and dried at 40° C. for 24 hours to obtain the fluorinated polycaprolactone membrane. The membrane was cut into a round sheet with the diameter of about 10 mm and weight of about 0.04 g. The cut wafer was washed in ethanol to remove impurities on the surface of the membrane. Finally, the wafer was washed with deionized water, placed in a vacuum oven, and dried at 37° C. for 24 hours to obtain the clean wafer. Reserved for degradation.

Weigh the prepared slices separately and placed them in the numbered wells of the plate, and then used the pipette to transfer 3 mL of 8 U/mL (0.027 mg/mL) of *Aspergillus oryzae* lipase PBS (pH=7.2 to 7.4) solution, added to the corresponding wells of the culture plate. Each disc was completely immersed in the enzyme solution, and three samples were set at each degradation time point to reduce accidental errors. After they were degraded for 12 h, 24 h, 48 h, and 72 h, they were taken out and washed with a large amount of deionized water to remove soluble impurities on the surface. Subsequently, it was placed in a vacuum oven, dried at 37° C. for 24 hours, and weighed and recorded.

The weight loss rates of PCL2000-PTFOA samples measured respectively for 12 hours, 24 hours, 48 hours, and 72 hours was 1.5%, 5.2%, 8.0%, and 12.1%. After 72 hours of enzyme-catalyzed degradation of polycaprolactone block modified fluoroalkyl polymer products, it degraded very slowly. The average contact angle obtained after five tests was 98.5±1.3°.

Figure 14:
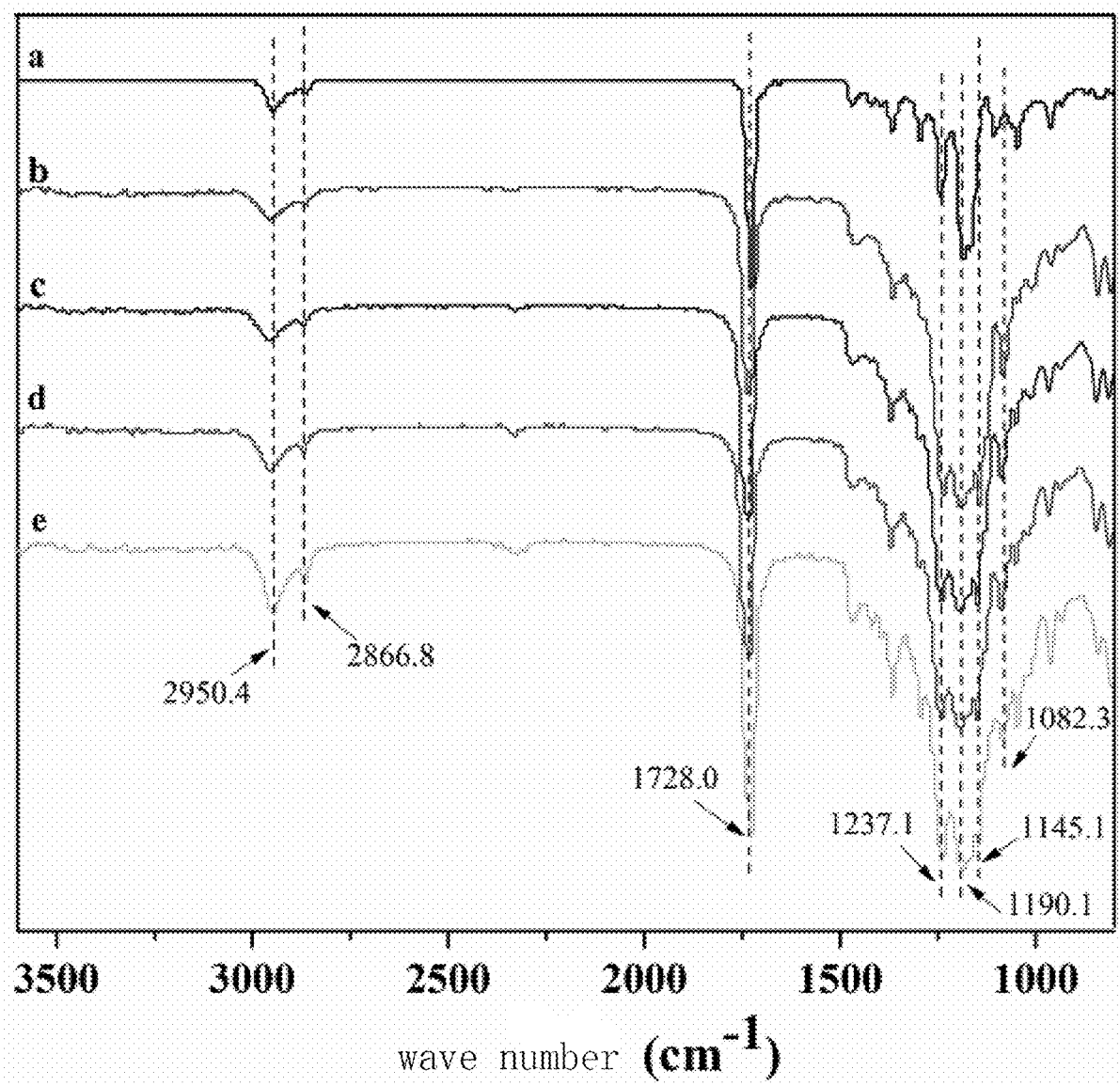
FIG. 14 shows the infrared absorption curves of unmodified polycaprolactone (PCL) and the fluorinated polycaprolactone membranes were prepared according to the examples of the present invention. Among them, curve a is an unmodified polycaprolactone, curve b is a fluorinated polycaprolactone membrane prepared in Example 1, curve c is a fluorinated polycaprolactone membrane prepared in Example 2, and curve d is an Example 3 The fluorinated polycaprolactone membrane prepared, and curve e is the fluorinated polycaprolactone membrane prepared in Example 4.

FIG. 14 shows the infrared absorption curves of unmodified polycaprolactone (PCL) and the fluorinated polycaprolactone membranes were prepared according to the examples of the present invention. Among them, curve a was the unmodified polycaprolactone, curve b was the fluorinated polycaprolactone membrane prepared in Example 1, curve c was the fluorinated polycaprolactone membrane prepared in Example 2, and curve d was the fluorinated polycaprolactone membrane prepared in Example 3, and the curve e was t the fluorinated polycaprolactone membrane prepared in Example 4.

In the FIG. 14, the absorption peaks at 2950.4 $cm^{-1}$ and 2866.8 $cm^{-1}$ are belong to the symmetrical and antisymmetric stretching vibration peaks of —CH, and 1728.0 $cm^{-1}$ belongs to the stretching vibration absorption peaks of C=O. The peaks at 1237.1 $cm^{-1}$ 1,1190.1 $cm^{-1}$, 1145.1 $cm^{-1}$, and 1082.3 $cm^{-1}$ are belong to the characteristic absorption peaks of C—F, and the peaks at 1237.1 $cm^{-1}$ and 1190.1 $cm^{-1}$ are overlap with the characteristic absorption peaks of C=O.

Compare with the infrared absorption curve a of the unmodified PCL, it can be clearly seen that, appears the characteristic absorption peak of C—F in the PCL infrared absorption curve after fluoropolymer block modification.

Figure 15:
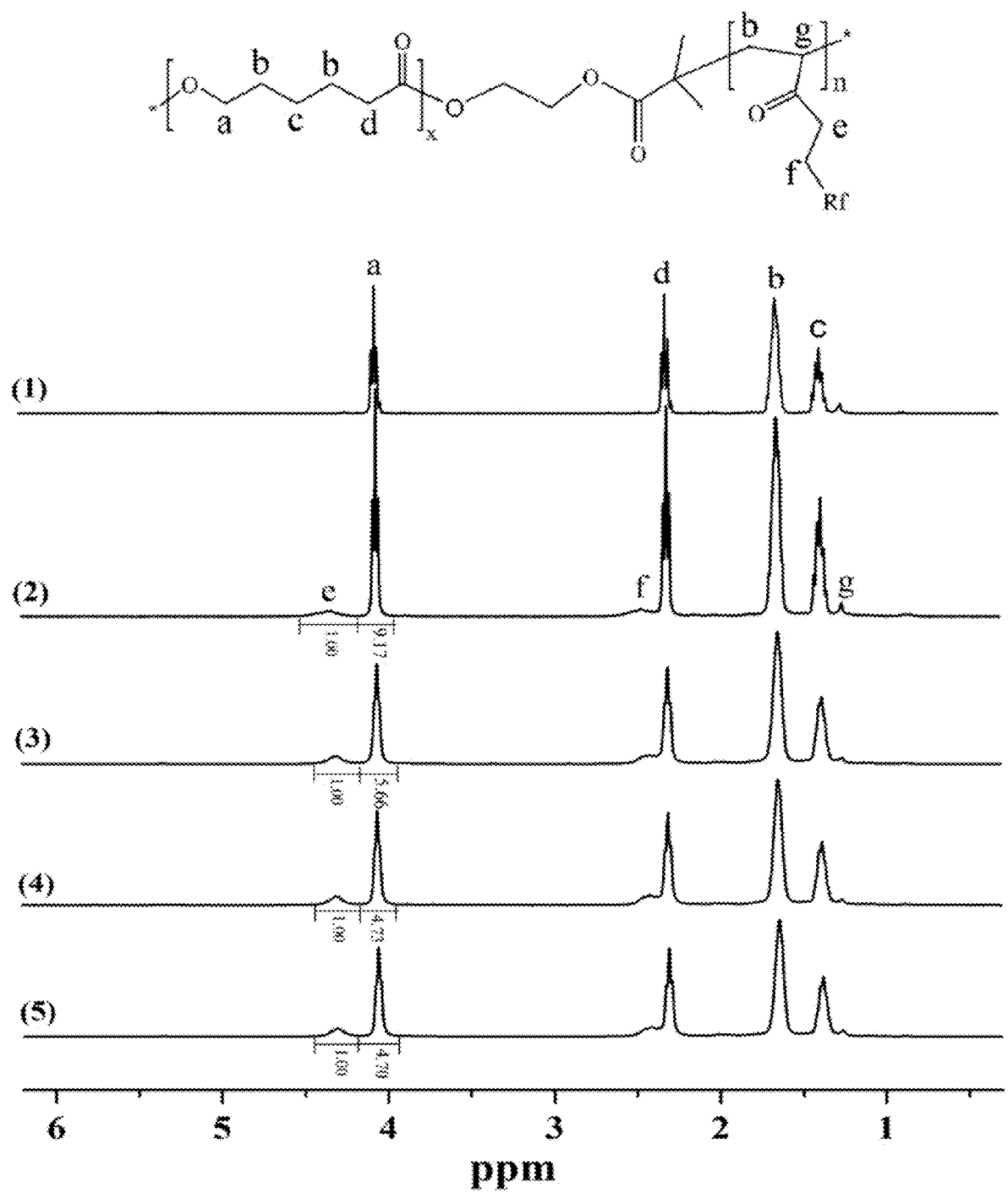
FIG. 15 shows the NMR chart of unmodified polycaprolactone (PCL) and the fluorinated polycaprolactone membranes prepared in the examples of the present invention. Wherein, curve (1) was about unmodified polycaprolactone, curve (2) was about the fluorinated polycaprolactone membrane prepared in Example 1, and curve (3) was about the fluorinated polycaprolactone membrane prepared in Example 2. Curve (4) was about the fluorinated polycaprolactone membrane prepared in Example 3, and curve (5) was about the fluorinated polycaprolactone membrane prepared in Example 4.

FIG. 15 shows the NMR chart of unmodified polycaprolactone (PCL) and the fluorinated polycaprolactone membranes prepared in the examples of the present invention. Wherein, curve (1) was about unmodified polycaprolactone, curve (2) was about the fluorinated polycaprolactone membrane prepared in Example 1, and curve (3) was about the fluorinated polycaprolactone membrane prepared in Example 2. Curve (4) was about the fluorinated polycaprolactone membrane prepared in Example 3, and curve (5) was about the fluorinated polycaprolactone membrane prepared in Example 4.

In the FIG. 15, the peaks of 4.05 ppm, 2.31 ppm, 1.65 ppm, and 1.39 ppm are respectively assigned to the peaks of —$CH_2$— in the structural unit of the PCL chain. In addition, in the curves (2), (3), (4), and (5), the peak e aT 4.31 ppm is assigned to the peak of O=$COCH_2$, and the peak fat 2.42 ppm is the characteristic peak of —$CH_2C_6F_{13}$.

Figure 16:
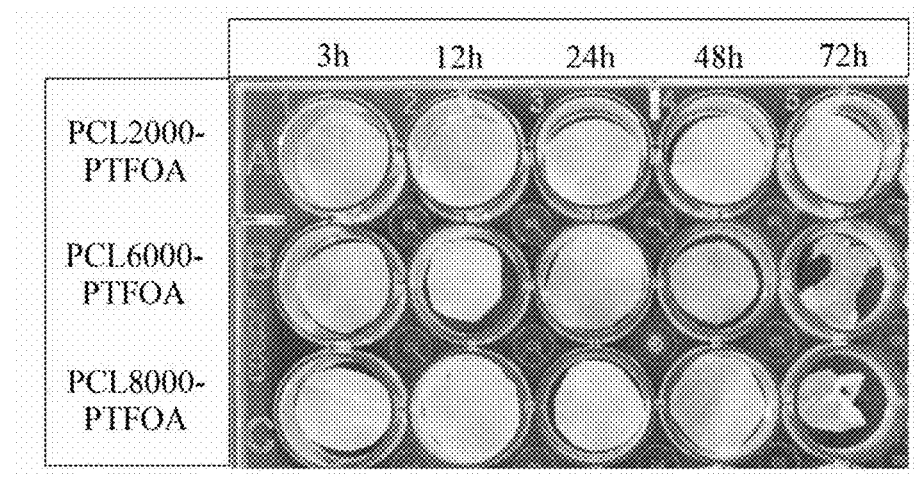
FIG. 16 is the photographic view of the degradation process of the polycaprolactone-modified fluoropolymer of the present invention.

FIG. 16 is the photographic view of the degradation process of the polycaprolactone-modified fluoropolymer of the present invention; in which, the polycaprolactone 2000 (PCL2000) block-modified fluoropolymer material PCL2000-PTFOA of the comparative example is slowly degraded; The polycaprolactone block-modified fluoropolymers PCL6000-PTFOA and PCL8000-PTFOA prepared in Examples 8 and 9 had largely degraded after 72 hours of enzymatic treatment, and polycaprolactone 8000 (PCL8000) block modified fluoropolymer materials have less residue and more complete degradation.

Figure 17:
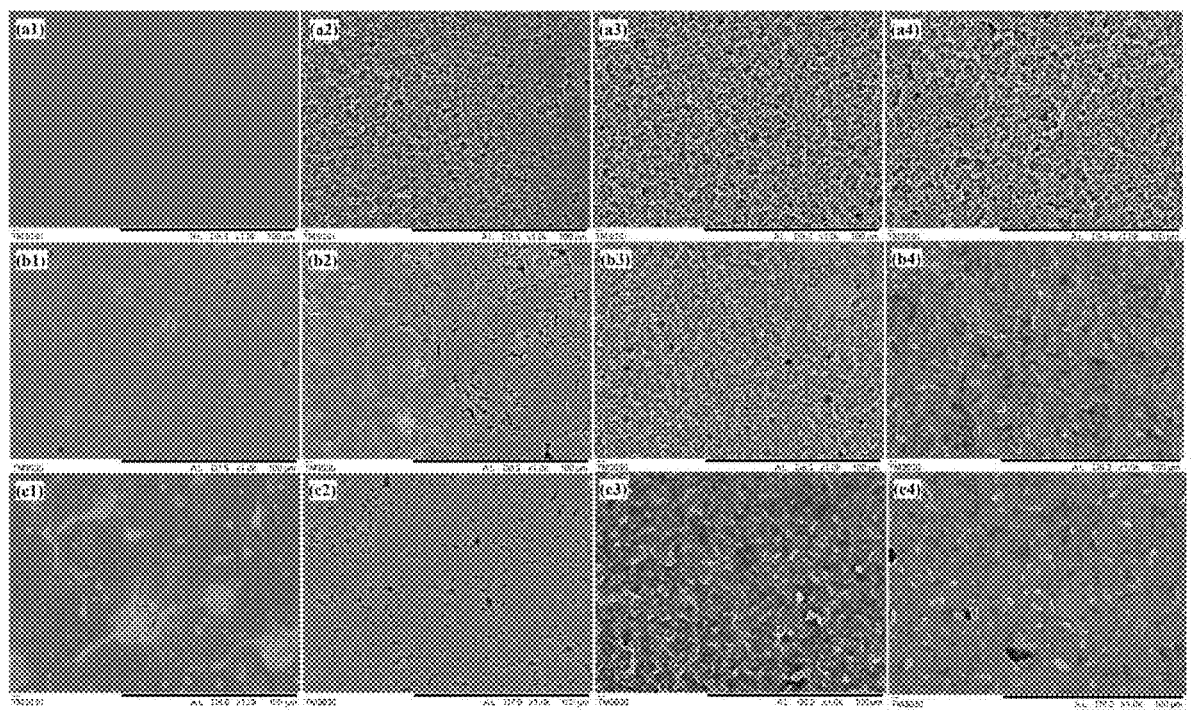
FIG. 17 is the SEM morphology diagram of the degradation process of the fluorinated polycaprolactone membrane of the present invention.

FIG. 17 is the SEM morphology diagram of the degradation process of the fluorinated polycaprolactone membrane of the present invention. Among them, 1, 2, 3, and 4 respectively represent the morphology of the enzyme before catalytic degradation, degradation after 12 h, degradation after 48 h, and degradation after 72 h; the a is the morphology of the enzyme before catalytic degradation, degradation after 12 h, degradation after 48 h from PCL4000-PTFOA prepared according to Example 7; the b is the morphology of the enzyme before catalytic degradation, degradation after 12 h, degradation after 48 h from PCL6000-PTFOA prepared according to Example 8; the c is the morphology of the enzyme before catalytic degradation, degradation after 12 h, degradation after 48 h from PCL8000-PTFOA prepared according to Example 9.

Figure 18:
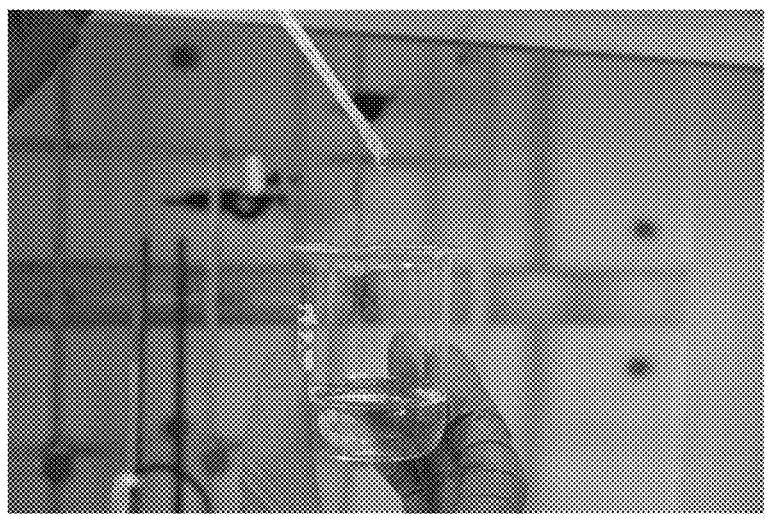
FIG. 18 shows the photographs of the fluorinated polycaprolactone solution according to the present invention, wherein the solvent is dichloromethane and the solution concentration is 2 wt % in the (a); the solvent is tetrahydrofuran and the solution concentration is 3 wt % in the (b); the solvent is dichloromethane and the solution concentration is 10 wt % in the (c)
Figure 18:
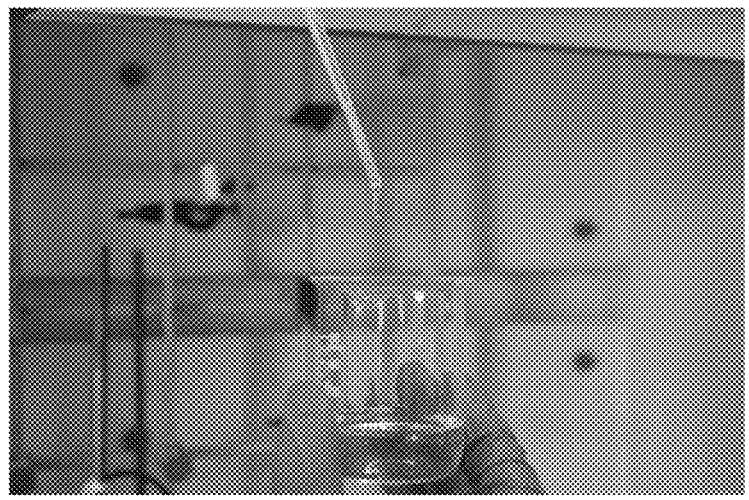
Figure 18:
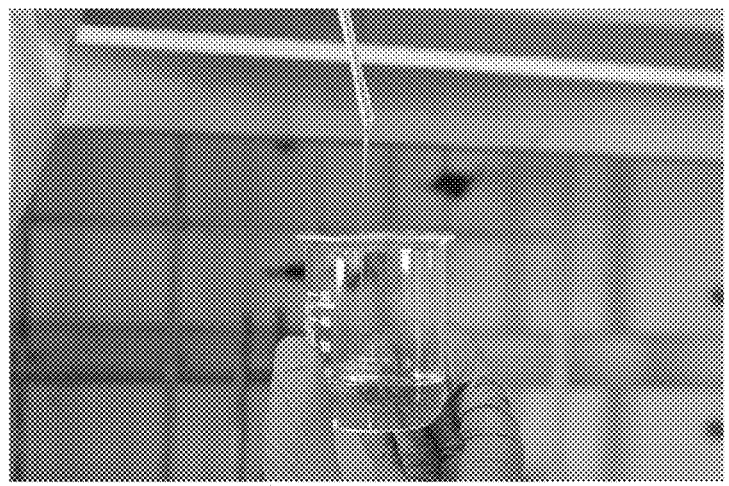
Figure 19:
FIG. 19 is the photographs of the fluorinated polycaprolactone membrane of the present invention, wherein the solvent is dichloromethane and the solution concentration is 3 wt % in the (a); the solvent is tetrahydrofuran and the solution concentration is 10 wt % in the (b). It is shown that the fluorine-containing polycaprolactone of the present invention has good solubility and good film-forming property.
Figure 19:

FIG. 18 shows the photographs of the fluorinated polycaprolactone solution according to the present invention, wherein the solvent is dichloromethane and the solution concentration is 2 wt % in the (a); the solvent is tetrahydrofuran and the solution concentration is 3 wt % in the (b); the solvent is dichloromethane and the solution concentration is 10 wt % in the (c); FIG. 19 is the photographs of the fluorinated polycaprolactone membrane of the present invention, wherein the solvent is dichloromethane and the solution concentration is 3 wt % in the (a); the solvent is tetrahydrofuran and the solution concentration is 10 wt % in the (b). It is shown that the fluorine-containing polycaprolactone of the present invention has good solubility and good film-forming property.

The preparation method of the fluorinated polycaprolactone membrane of the present invention uses the atom transfer radical polymerization (ATRP) method to synthesize a hydrophobic fluorine-containing alkyl polyacrylate, and then directly prepares a block polymer through the condensation of polymers, which belongs to polymers Synthesis field. The disclosed fluorinated polycaprolactone film and the preparation method thereof adopt mild reaction conditions in the preparation process to avoid degradation of the polycaprolactone, and the obtained modified PCL polymerization product has a controllable structure and a high molecular weight, much better film-forming, excellent processability. In the modified polycaprolactone structure, a structure-controllable fluorinated polyacrylate was introduced, so the hydrophobicity of the modified product was controllable; due to the introduction of biodegradable and enzymatically degradable polycaprolactone in the fluorinated polyacrylate structure Ester, so the modified product is degradable.

The invention claimed is:

1. A method of preparing a fluorinated polycaprolactone membrane, comprising the following steps:
   (1) reacting a polycaprolactone with an aminoalcohol compound to prepare a hydroxyl-terminated polycaprolactone;
   (2) reacting the hydroxyl-terminated polycaprolactone with an anhydride to prepare a carboxyl-terminated polycaprolactone;
   (3) reacting an ethylene glycol bromoisobutyrate with a fluorinated acrylate to prepare a hydroxyl-terminated fluoro-acrylate polymer;
   (4) reacting the carboxyl-terminated polycaprolactone with the hydroxyl-terminated fluoro-acrylate polymer to prepare a fluorinated polycaprolactone;
   (5) at room temperature, dissolving the fluorinated polycaprolactone in an organic solvent to prepare a solution; then naturally drying the solution at room temperature to prepare the fluorinated polycaprolactone membrane.

2. The method according to claim 1, wherein the fluorinated polycaprolactone has the following the chemical formula:

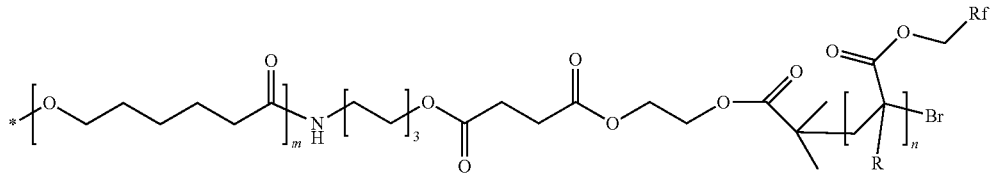

wherein Rf is a fluorinated alkyl; R is hydrogen or methyl; m is 35 to 1300; n is 5 to 100; and the fluorinated alkyl is nonafluoropentyl, tridecafluorooctyl, hexafluorobutyl, dodecafluoroheptyl, or octafluoropentyl.

3. The method according to claim 1, wherein the organic solvent is dichloromethane, tetrahydrofuran, a fluorosolvent or a combination thereof; and the solution has a concentration of 1 to 10 wt %.

4. The method according to claim 1, wherein a molecular weight of the polycaprolactone is 45600 to 148200; the aminoalcohol compound is 6-Amino-1-hexanol; the anhydride is succinic anhydride; the fluorinated acrylate is fluoropentyl acrylate, trifluorooctyl acrylate, heptadecafluorodecyl acrylate, hexafluorobutyl acrylate, dodecylfluoroheptyl acrylate, or octafluoropentyl acrylate.

5. The method according to claim 1, wherein a mass ratio of the polycaprolactone and aminoalcohol compounds is 1:0.2 to 2; a mass ratio of the hydroxyl-terminated polycaprolactone and anhydrides is (1 to 200):(0.5 to 2); a mass ratio of the ethylene glycol bromoisobutyrate and fluorinated acrylate is $(1\times10^{-6}$ to $5\times10^{-5})$:(0.5 to 5); a mass ratio of the carboxyl-terminated polycaprolactone and hydroxyl-terminated fluoro-acrylate polymer is (1 to 4):(0.05 to 10).

6. The method according to claim 1, wherein the step (1) is conducted at room temperature under nitrogen protection for 1 to 24 hours; the step (2) is conducted at room temperature under nitrogen protection for 1 to 6 hours; the step (3) is conducted at 50 to 90° C. under nitrogen protection for 1 to 24 hours; and the step (4) is conducted at 30 to 65° C. under nitrogen protection for 1 to 8 hours.

7. The method according to claim 1, wherein the step (1) is conducted in the organic solvent; the step (2) is conducted in the organic solvent in the presence of anhydrous potassium carbonate and 4-dimethylaminopyridine; the step (3) is conducted in the organic solvent in the presence of pentamethyldiethylenetriamine and cuprous bromide; and the step (4) is conducted in the organic solvent in the presence of N,N'-carbonyldiimidazole.

8. The method according to claim 1, wherein in the step (4), the carboxyl-terminated polycaprolactone is reacted with N,N'-carbonyldiimidazole under nitrogen for 1 to 24 hours at room temperature; then hydroxyl-terminated fluoro-acrylate polymer solution is added and reacted at 30 to 65° C. for 1 to 8 hours to prepare the fluorinated polycaprolactone.

9. A fluorinated polycaprolactone membrane prepared in accordance with the method of claim 1.

10. A hydrophobic or biodegradable material, comprising the fluorinated polycaprolactone membrane of claim 9.

* * * * *